July 7, 1942.                A. M. ROSSMAN                 2,288,650
                          ELECTRIC SWITCHING UNIT
                            Filed Oct. 2, 1939          13 Sheets-Sheet 1

INVENTOR.
Allen M. Rossman
BY Morris Spector
ATTORNEY.

July 7, 1942. A. M. ROSSMAN 2,288,650
ELECTRIC SWITCHING UNIT
Filed Oct. 2, 1939 13 Sheets-Sheet 5

INVENTOR.
Allen M. Rossman
BY Morris Spector
ATTORNEY.

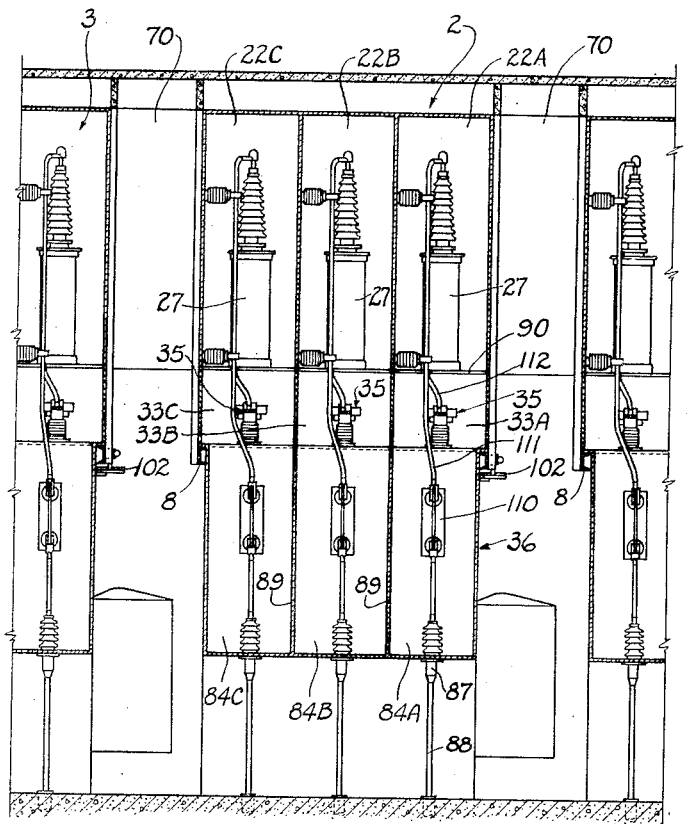
Fig. 7
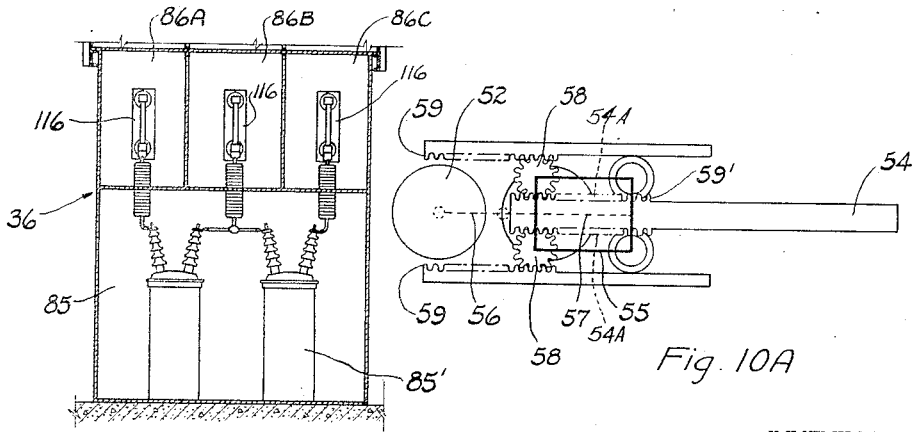
Fig. 8
Fig. 10A
INVENTOR.
Allen M. Rossman
BY Morris Spector
ATTORNEY.

July 7, 1942.　　　A. M. ROSSMAN　　　2,288,650
ELECTRIC SWITCHING UNIT
Filed Oct. 2, 1939　　　13 Sheets-Sheet 7
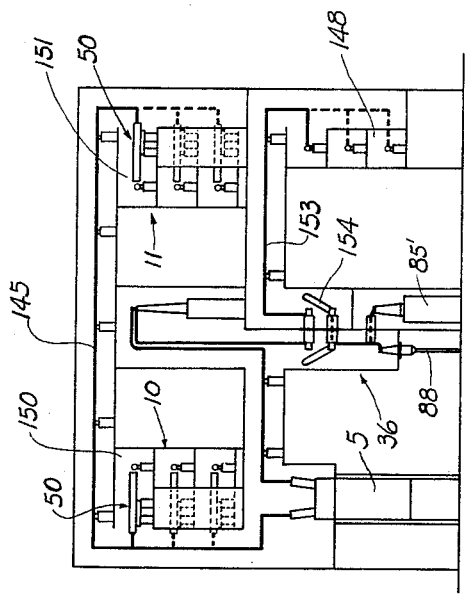
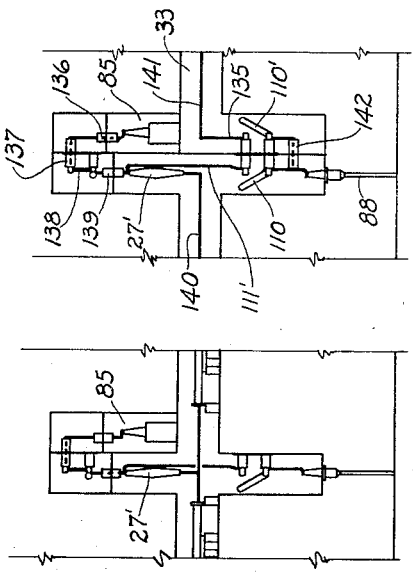
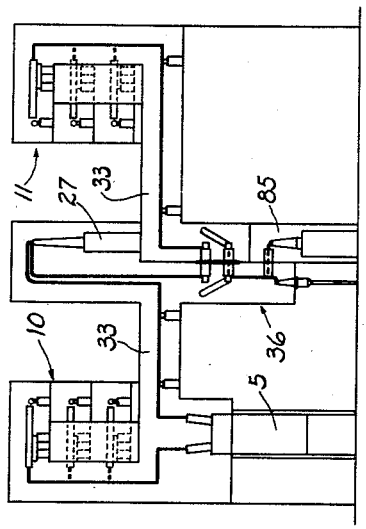
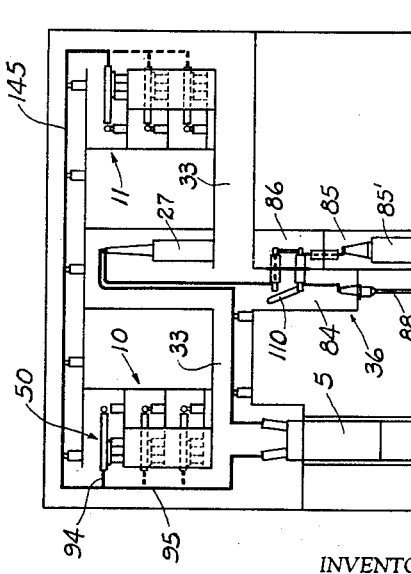
INVENTOR.
Allen M. Rossman
BY Morris Spector
ATTORNEY.

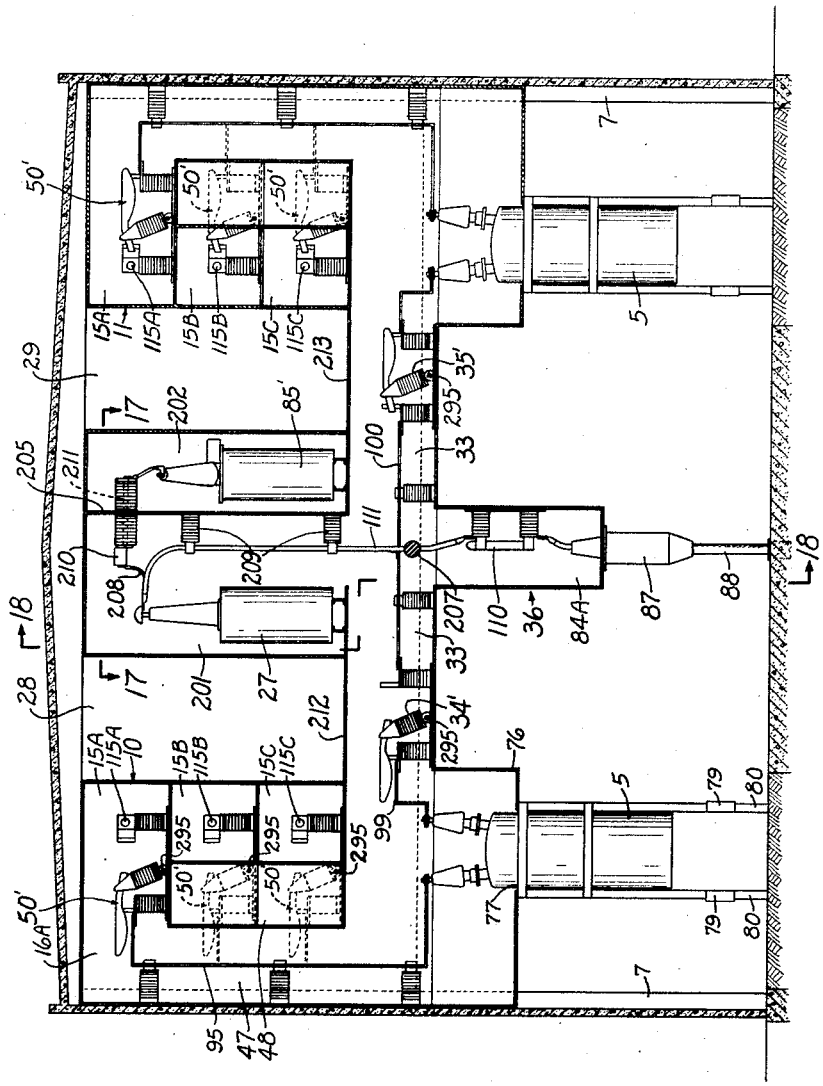

July 7, 1942.     A. M. ROSSMAN     2,288,650
ELECTRIC SWITCHING UNIT

Filed Oct. 2, 1939     13 Sheets-Sheet 9

INVENTOR.
Allen M. Rossman
BY Morris Spector
ATTORNEY.

July 7, 1942.  A. M. ROSSMAN  2,288,650
ELECTRIC SWITCHING UNIT
Filed Oct. 2, 1939  13 Sheets-Sheet 10

INVENTOR.
Allen M. Rossman
BY Morris Spector
ATTORNEY.

July 7, 1942.　　　A. M. ROSSMAN　　　2,288,650
ELECTRIC SWITCHING UNIT
Filed Oct. 2, 1939　　　13 Sheets-Sheet 11
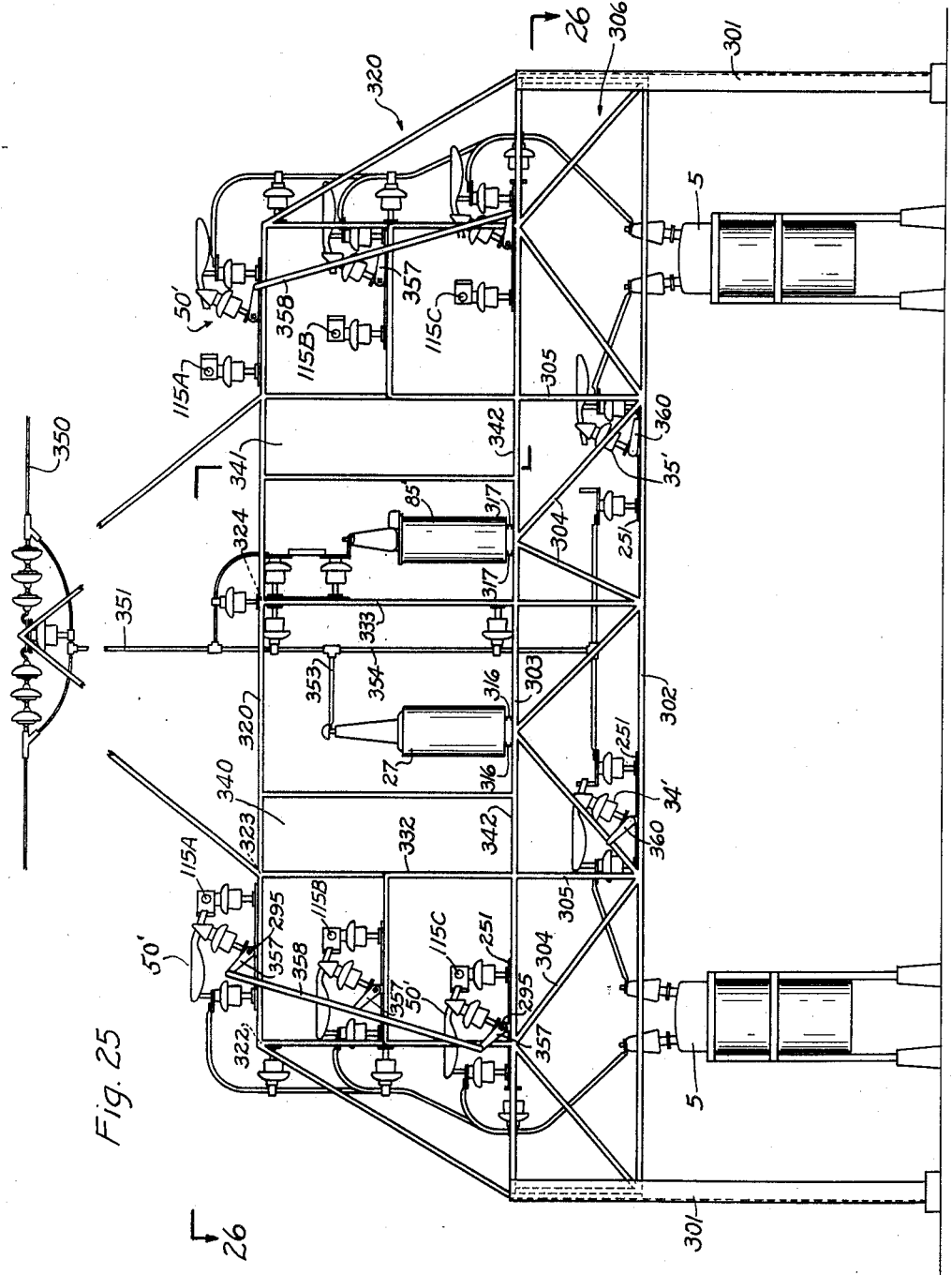
INVENTOR.
Allen M. Rossman
BY Morris Spector,
ATTORNEY.

July 7, 1942.    A. M. ROSSMAN    2,288,650
ELECTRIC SWITCHING UNIT
Filed Oct. 2, 1939    13 Sheets-Sheet 12

INVENTOR.
Allen M. Rossman
BY Morris Spector
ATTORNEY.

Patented July 7, 1942

2,288,650

UNITED STATES PATENT OFFICE 2,288,650

ELECTRIC SWITCHING UNIT

Allen M. Rossman, Wilmette, Ill.

Application October 2, 1939, Serial No. 297,569

45 Claims. (Cl. 175—298)

This application is a continuation in part of my application Serial No. 160,519, filed August 23, 1937.

This invention relates to electric bus and switching stations or switchgear, particularly such switchgear as are adapted for heavy duty, for ratings up to 34.5 k. v. and 4000 amperes or upwards, although the invention is not limited to that voltage or amperage of that magnitude.

It has heretofore been proposed to build switchgear in units each of which constitutes a complete factory-assembled structure, the arrangement being such that a plurality of such units can be placed in alignment so that each constitutes one bay of the station. Such factory-assembled units have either been limited to very much lower voltage ratings, or where the switchgear was for high voltages certain live parts such as the buses, disconnect switches and the like were immersed in insulating oil. This necessarily increased the initial cost of the structure as well as the maintenance changes. It is an object of the present invention to provide a switchgear of the above character which does not require the immersion of the busbars and other current carrying parts in oil and which is nevertheless so compact that a unit of the voltages above mentioned is within standard railroad clearance size that it may be shipped as a factory-assembled unit on a standard flat railroad car. One typical factory-assembled switchgear unit includes the busbar compartments, bus supports, disconnect switches and operating mechanism therefor, contacts or terminal lugs for establishing connections with the circuit breakers and, optionally, the instrument current and potential transformers. This unit is entirely enclosed, and is adapted to receive connections to the oil circuit breakers after the unit has been mounted in place at the station, the circuit breakers being located outside of the factory-assembled unit.

It is an object of the present invention to provide a switch gear which incorporates the compactness, safety and other desirable features of the oil-filled metal clad factory-assembled switchgear but has an appreciably lower cost. This object is attained in various ways, a few of which are enumerated below:

1. By eliminating the necessity for immersing the busbars and other current carrying parts in oil while maintaining the size of the unit sufficiently small to permit shipment thereof. This is accomplished by making the design such that the electric clearance distance between live parts and between live and grounded parts may be made sufficiently great to permit the use of bare conductors mounted on porcelain or other insulators without exceeding the maximum allowable size for shipment of the unit. As in the earlier oil filled switchgear, the phase connections are separated throughout the entire structure by grounded metal barriers.

2. By eliminating the necessity for an elevating device for the oil circuit breaker. Disconnecting switches separate from the breaker are used for isolating the breaker. The disconnecting switches are so constructed and located in the switchgear that the overall height of the unit is kept within limits for railroad shipment.

3. By providing a switchgear design of the above mentioned character which permits the use of standard oil circuit breakers with inclined bushings. Such bushings can be installed in a tank of smaller diameter than is required for the vertical bushings on a circuit breaker which must be lowered bodily to isolate it from its circuit connections.

4. By making all parts of the structure, both inside and out, easily accessible for assembly and adjustment.

Two styles of disconnecting switch which can be used in the present switchgear are illustrated and described. The important characteristic of the disconnecting switch is that the blade or contact making member moves in a path which is defined approximately by the longitudinal axis of the switch blade, as in the so-called bayonet type disconnecting switch. If desired, another design of bayonet type switch could be substituted for the disconnecting switches here shown. The disconnecting switch blade is always substantially parallel to its initial position as it moves to its switch closed or open position. The space requirements for the disconnecting switches is thus reduced to a minimum. The disconnecting switches are located so that they move in substantially a horizontal direction, each phase disconnecting switch blade moving in substantially the horizontal plane of the corresponding phase bus conductor, so that the paths of movement of the disconnecting switch blades lie in the natural paths of the main circuit conductors.

In a switchgear unit for a three phase system, which is the usual type of system for which the present gear is designed, the unit is divided across its width into three similar parts each extending the full length of the unit, each for the disconnecting switches, connecting conductors, etc., for one phase. In a unit of a width within the limits permissible for shipment on a standard flat railroad freight car each one-third part of the width is insufficient to permit the placing of two side by side conductors from the opposite poles of a circuit breaker and yet allow sufficient spacing to provide adequate insulation at 34.5 k.v. with air as the surrounding dielectric. The conductors and switching apparatus from opposite poles of each breaker are therefore spaced from each other longitudinally of the unit, or vertically of the unit or both longitudinally and vertically, but are not spaced from one another transversely of the unit. This permits the construction of a 34.5 k.v. unit of a width within the limits permissible for shipment on a flat car. In order to keep the width and height of the unit within the permissible shipping dimensions I separate the circuit breakers from the rest of the unit so that the breakers may be shipped separately from the rest of the unit and connected to the same at the place of installation. This presents no great difficulty since with air as the dielectric surrounding the live parts it is not necessary to provide liquid-tight seals such as must be provided on the oil-filled switchgear. By separating the breakers from the rest of the unit more space is available both transversely of the unit, and vertically so that the various live parts may be sufficiently separated from one another to provide adequate insulation at 34.5 k.v. with air as the surrounding dielectric and yet not exceed the maximum dimensions permissible to allow shipment on a flat railroad car.

The attainment of the above and further objects of the present invention will be apparent from the following specification taken in conjunction with the accompanying drawings forming a part thereof.

Figure 2:
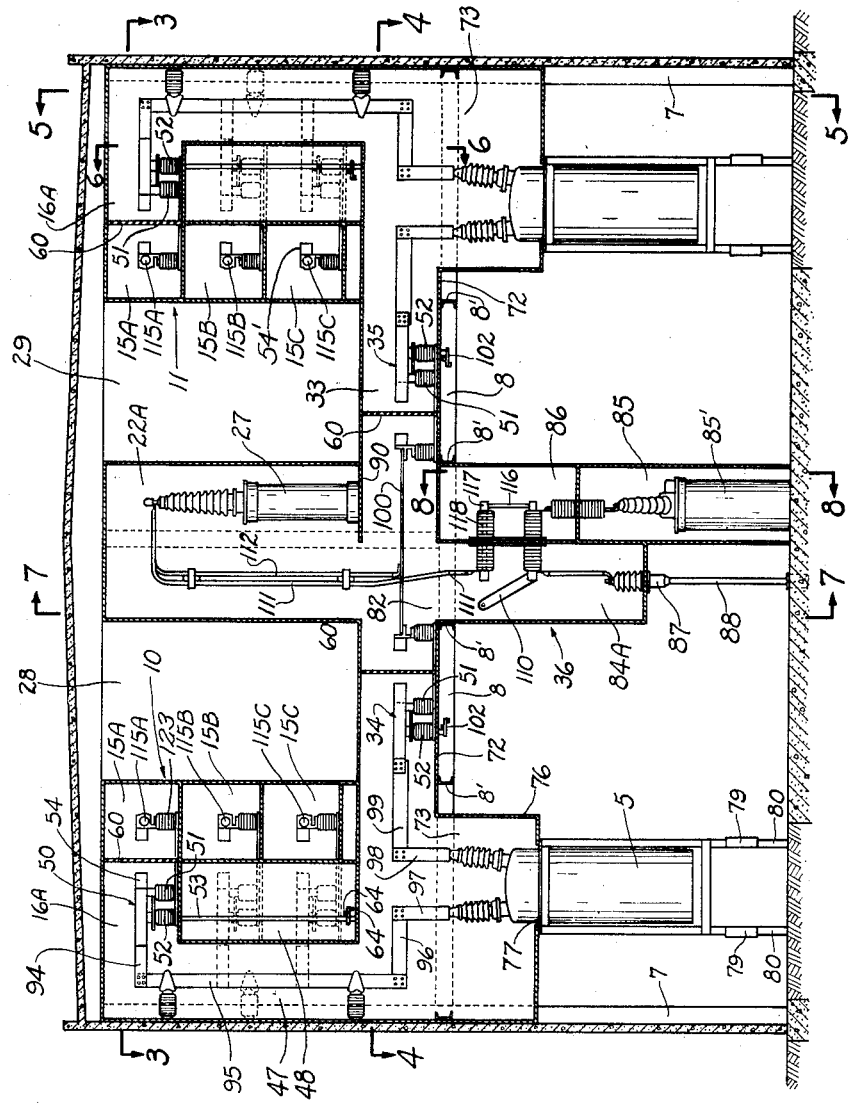
Figure 2 is a transverse sectional view through the station of Figure 1, said view being a longitudinal sectional view through one unit or bay of the station.

Figures 3, 4, 5, 6, 7 and 8 are sectional views taken, respectively, along the lines 3—3, 4—4, 5—5, 6—6, 7—7 and 8—8 of Figure 2 and each looking in the direction of the arrows indicated;

Figure 9 is a front view of an insulating plate used at the juncture between each busbar compartment and its corresponding busbar disconnecting switch compartment.

Figure 10:
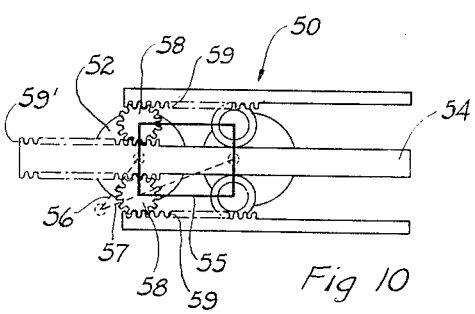
Figure 17:
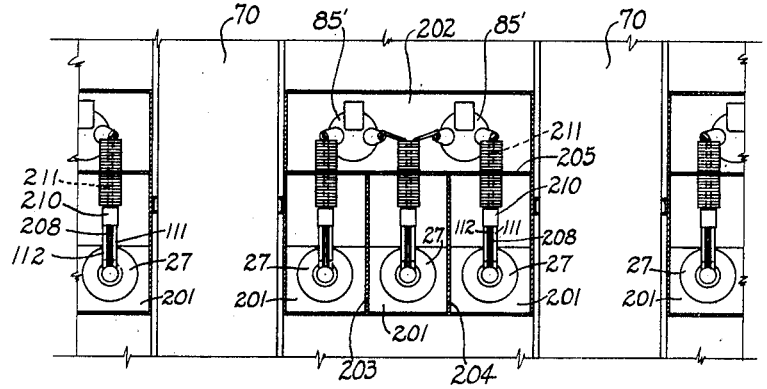
Figure 18:
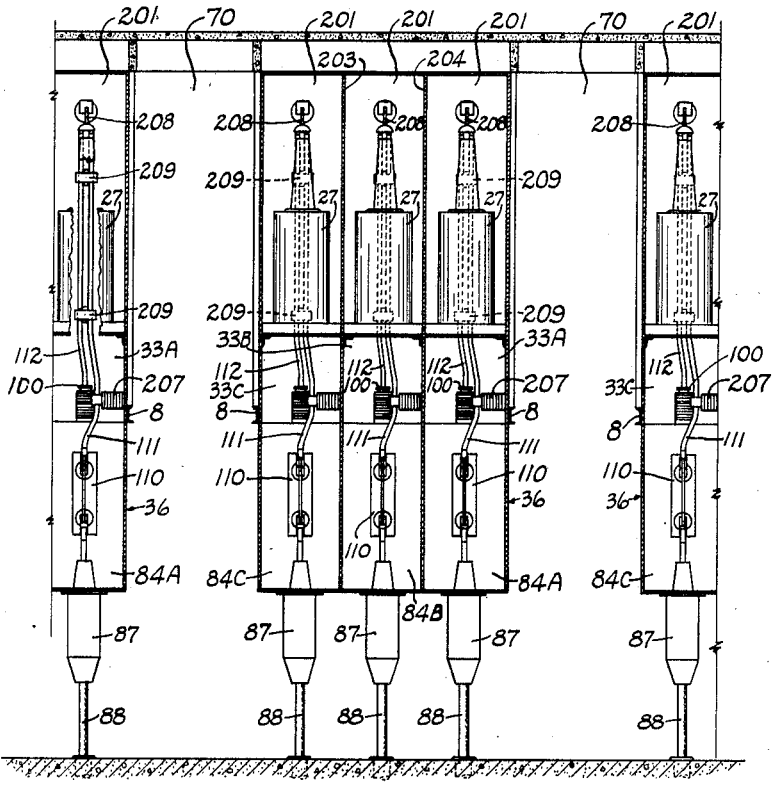
Figure 19:
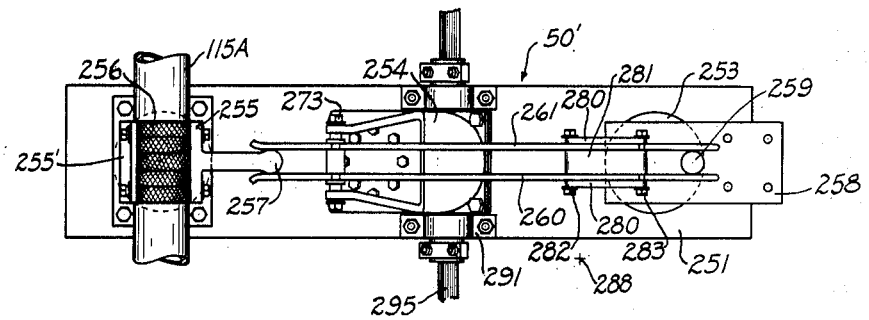
Figure 20:
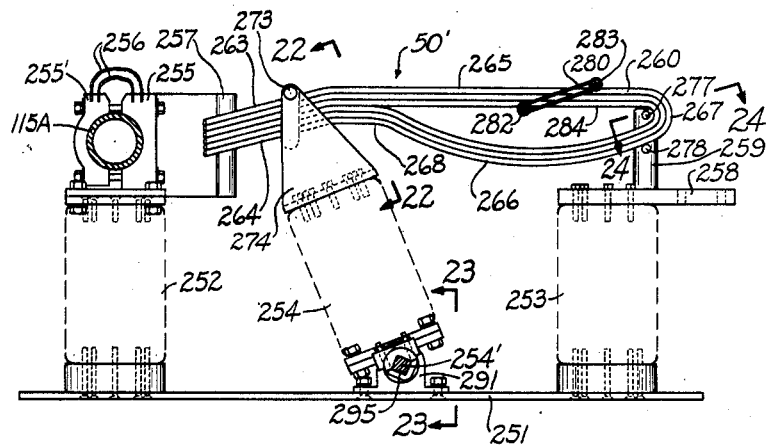
Figure 22:
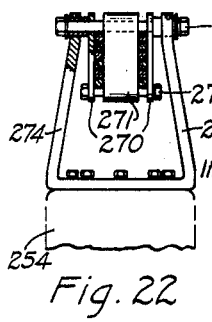
Figures 21, 24:
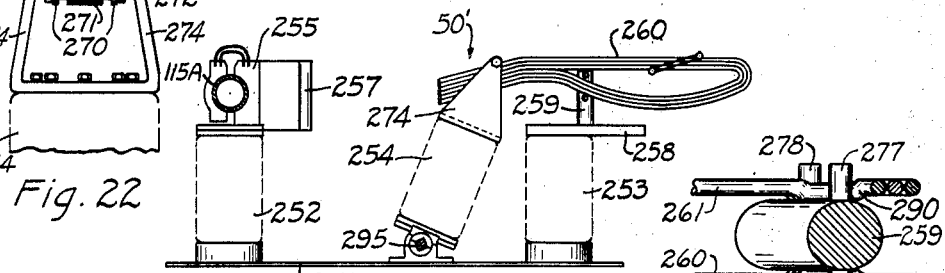
Figure 23:
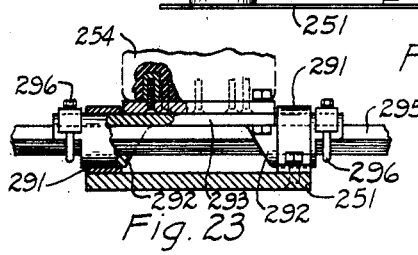
Figure 26:
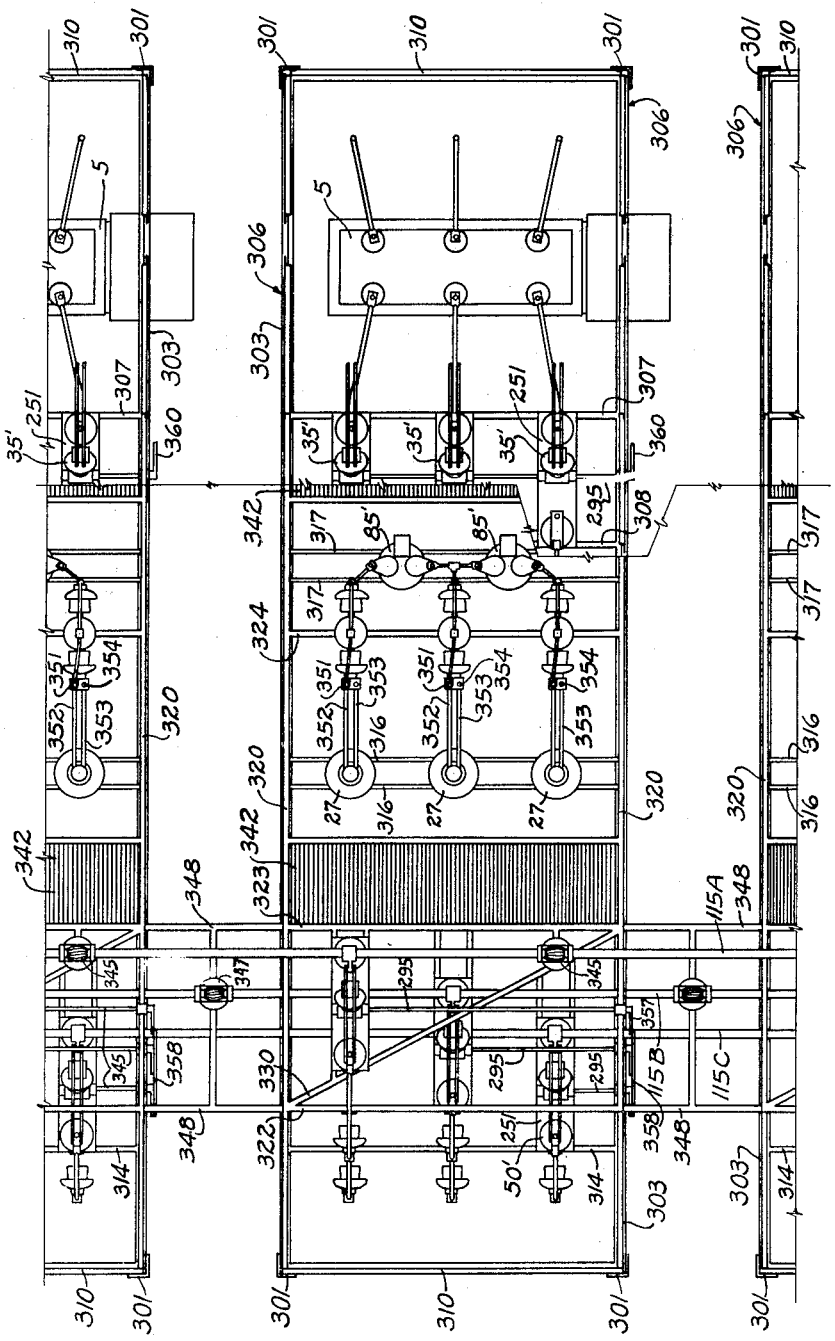
Figure 27:
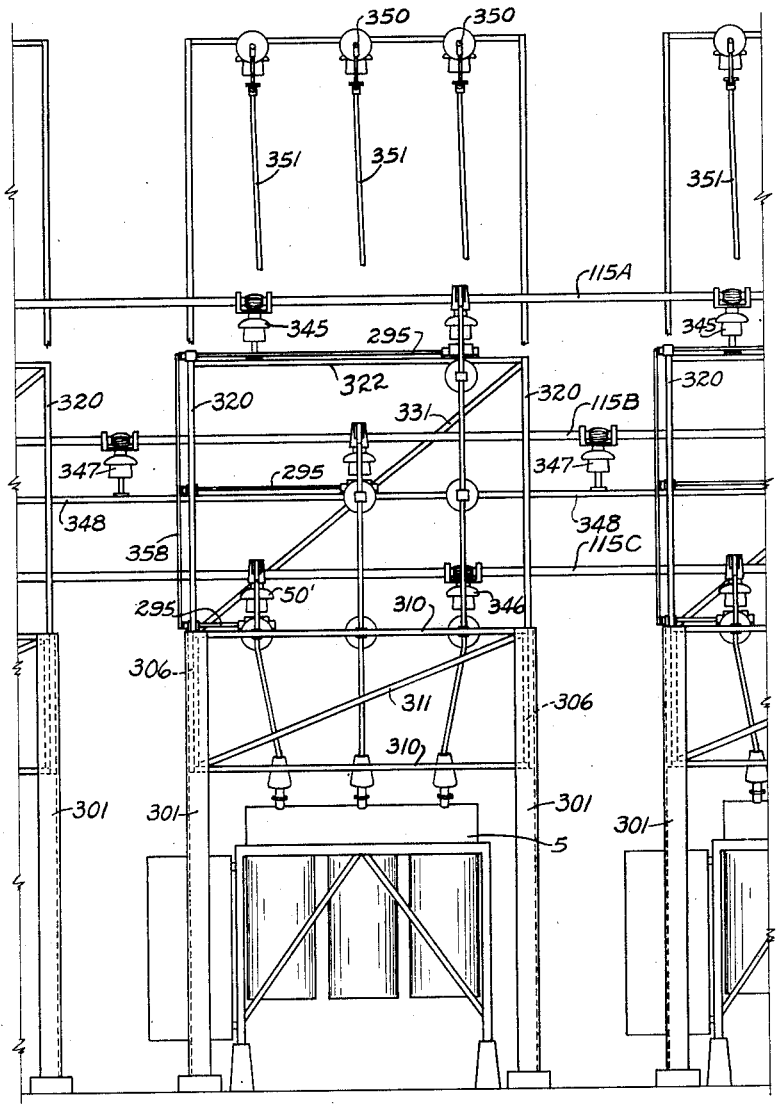

Figures 10 and 10A are, respectively, diagrammatic top views illustrating the open and closed positions of a disconnecting switch of one of the types which may be used in this substation;

Figure 11 is a diagrammatic fragmentary sectional view illustrating an alternate construction for the line or circuit leads of a unit like Figure 2 and of an alternate arrangement of the instrument transformers;

Figure 12 is a diagrammatic view illustrating still another alternate arrangement;

Figure 13 is a diagrammatic view illustrating the principles of the present invention as applied to a double bus switching unit with one oil circuit breaker;

Figure 14 is a diagrammatic view illustrating the construction of a unit for connecting a circuit either to a main bus by means of a circuit breaker, or to a transfer bus by means of a disconnecting switch;

Figure 15 is a diagrammatic view illustrating a double main bus with one unit comprising a double main bus with one oil circuit breaker, and a single transfer bus;

Figure 16 is a transverse sectional view corresponding to Figure 2 and illustrating a modified construction;

Figure 17 is a fragmentary sectional view taken along the line 17—17 of Figure 16;

Figure 18 is a sectional view taken along the line 18—18 of Figure 16;

Figure 19 is a top view of one of the disconnecting switches of the switchgear of Figure 16;

Figure 20 is a side view of this disconnecting switch;

Figure 21 is a side view of the disconnect switch in its open position;

Figure 22 is a sectional view taken along the line 22—22 of Figure 20 when the rocking insulator is in its mid position;

Figure 23 is a fragmentary sectional view taken along the line 23—23 of Figure 20;

Figure 24 is an enlarged fragmentary sectional view taken along the line 24—24 of Figure 20;

Figure 25 is a transverse sectional view corresponding to Figure 2, and illustrating a modified construction;

Figure 26 is a sectional view taken along the line 26—26 of Figure 25 and looking in the direction of the arrows; and Figure 27 is an end view of a portion of the station of Figure 25.

Like reference numerals refer to like parts throughout the specification and drawings.

Figure 1:
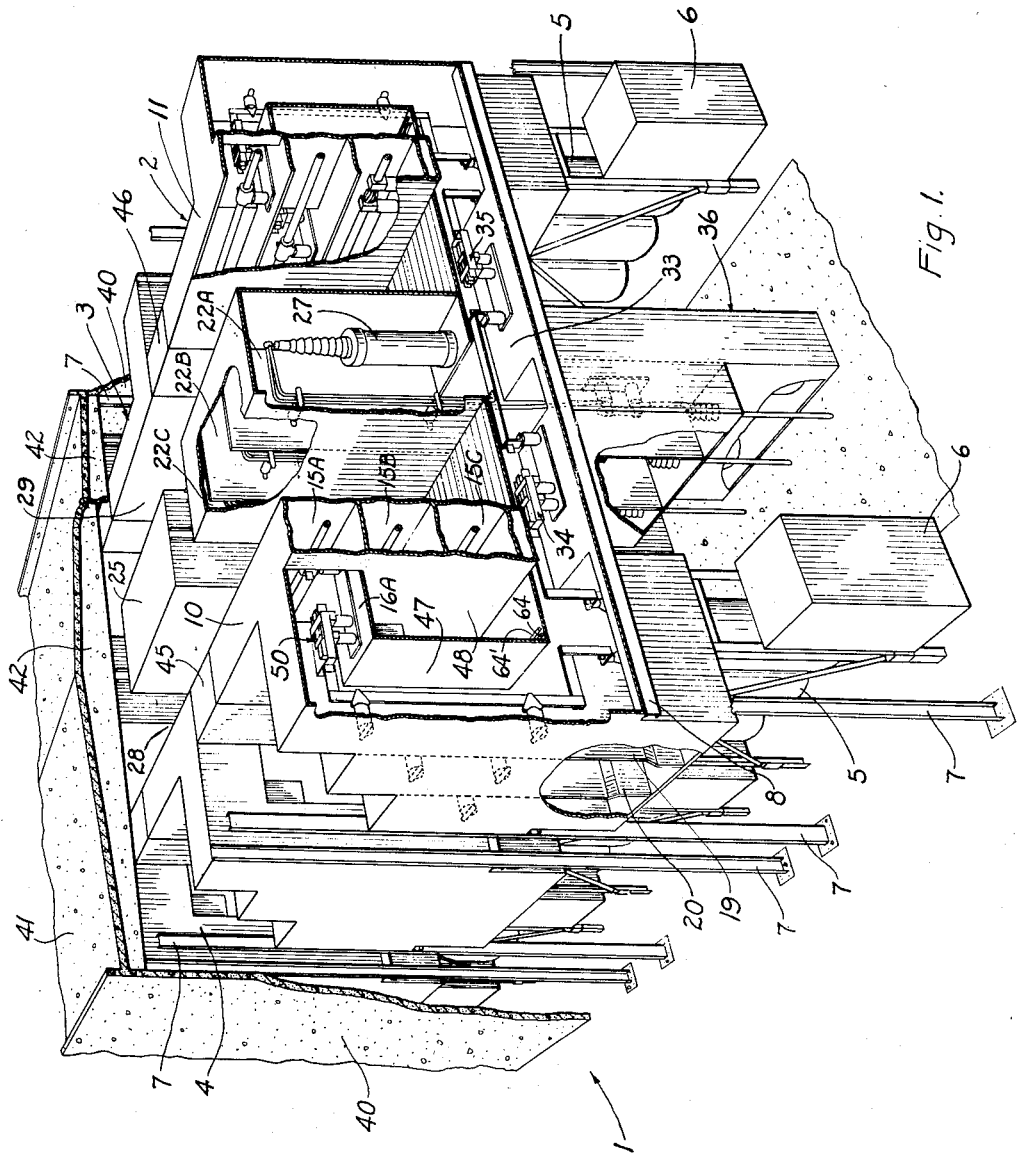
Figure 1 is a perspective view of a bus and switching station constructed in accordance with the teachings of the present invention, parts of the station being broken away to illustrate the interior construction thereof.

Reference may now be had more particularly to the station illustrated in Figure 1. The station is indicated in general by the reference numeral 1 and comprises a plurality of similar side by side units 2, 3 and 4 each of which constitutes one bay of the station. The busbars, disconnecting switches, and circuit connections are mainly in the upper story of the station and each bay is provided with one or more sets of circuit breakers 5—5 having operating mechanism 6—6 which constitute the lower story of the unit. Each unit is supported by vertical uprights, indicated at 7—7, and each includes a plurality of beams 8—8 extending longitudinally of the unit, or transversely of the station, and beams 8'—8' at right angles thereto, which act as skids during shipment of the unit to protect the disconnecting switch operating mechanism as hereinafter explained. The station illustrated in Figure 1 is a three phase station and the unit 2 is a double bus structure having two similar sections 10—11, one at each end thereof. Each section 10 and 11 includes three busbar compartments 15A, 15B and 15C, one for each phase. Each section also includes a disconnecting switch compartment 16A for the busbar compartment 15A, and corresponding disconnecting switch compartments for the other two busbar compartments. Each disconnecting switch compartment is in horizontal alignment with its corresponding busbar compartment and opens thereinto. The respective busbar disconnecting switch compartments are separated from one another by metal barriers 19—20.

At the center of the unit, between the busbar compartments of the sections 10—11, there are provided three instrument transformer compartments 22A, 22B and 22C for the respective phases, separated from one another by metal barriers and fully enclosed by a metal housing 25. Within these compartments are located current transformers 27. The current transformer compartments are spaced from the sections 10 and 11 of the unit to provide aisles 28 and 29 between those compartments and the sections 10 and 11. These aisles extend transversely of the unit, which is longitudinal of the station, and are continuous from bay to bay to form aisles through which a person may walk to reach the various parts of the station for inspection, repair or other purposes. Below the disconnecting switch compartments, busbar compartments and current transformer compartments there are provided a plurality of line or circuit connecting compartments 33 that extend longitudinally of the unit and afford communication between the disconnecting switch compartments on opposite sides of the unit. Within the line connecting compartment of each phase there are located two line or circuit disconnecting switches 34 and 35. Each section of the unit is provided with openings at the bottom thereof for receiving circuit breaker connections in a manner to be more fully set forth as this description proceeds. Below the line connecting compartment 33 and located at the center of the unit there is provided a circuit compartment 36 divided into three parts, one for each phase of the unit, for receiving the respective line conductors, and further subdivided to form compartments for potential transformers and for fuses and auxiliary equipment for those transformers.

The units are placed side by side with the corresponding busbar compartments of adjacent units in alignment. The busbar compartments are then joined by sections 45—46 of sheet metal to make the busbar compartments of aligned units continuous. The units are formed of sheet metal suitably panelled to permit access to the respective busbar compartments, disconnecting switch compartments and other compartments there provided. Aluminum or other nonmetallic material may be interposed at intervals to break up the magnetic circuit where necessary, as is well known in the art. Each busbar disconnecting switch compartment is provided with a vertically extending compartment 47 for establishing connections to the busbar disconnecting switches. Between this compartment and the busbar compartment there is a space 48 forming a compartment through which the operating rods and other mechanism for the respective disconnecting switches extends. The units 2, 3 and 4 of the respective bays may be mounted outdoors, unenclosed, or, if desired, a housing may be built around the respective units including vertical walls 40 of precast concrete slabs, brick, or other suitable materials, and a roof 41 supported by transverse girders 42, which are in turn supported by the end and intermediate uprights 7—7.

Figure 4:
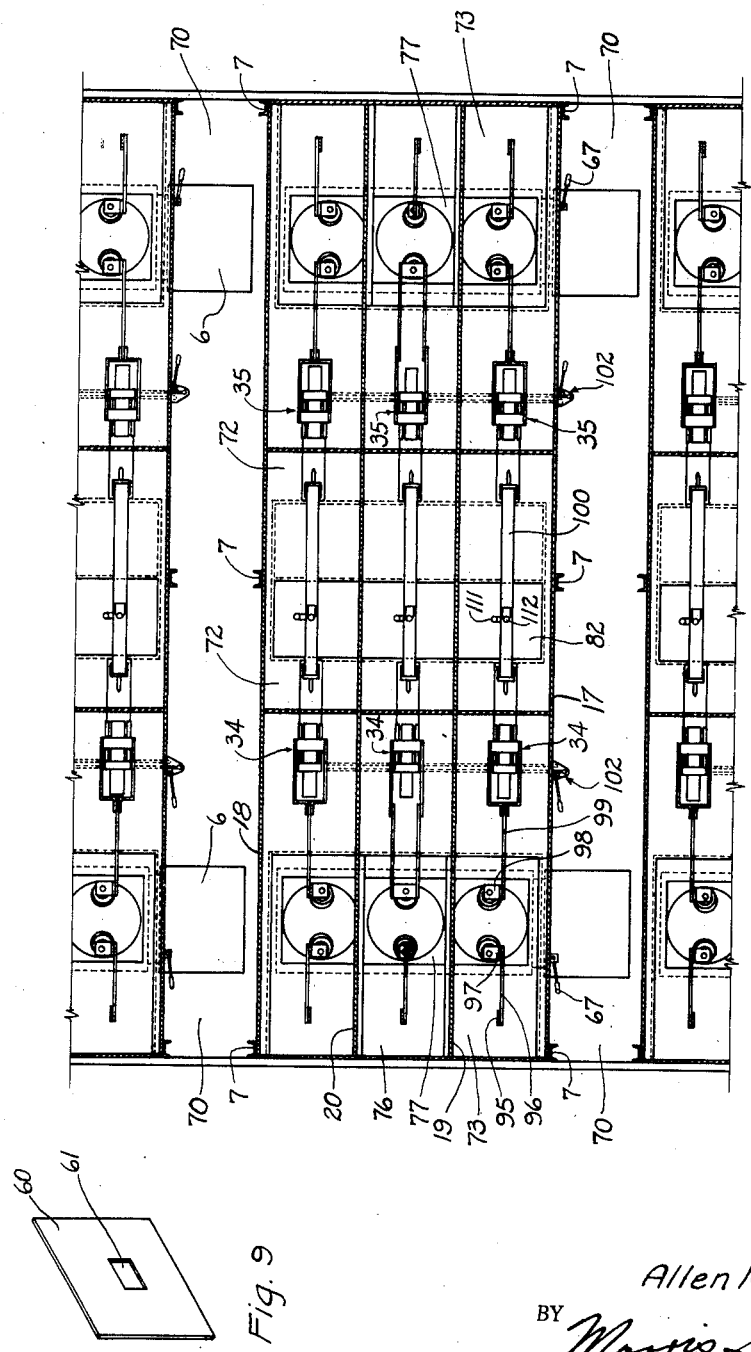
Figure 5:
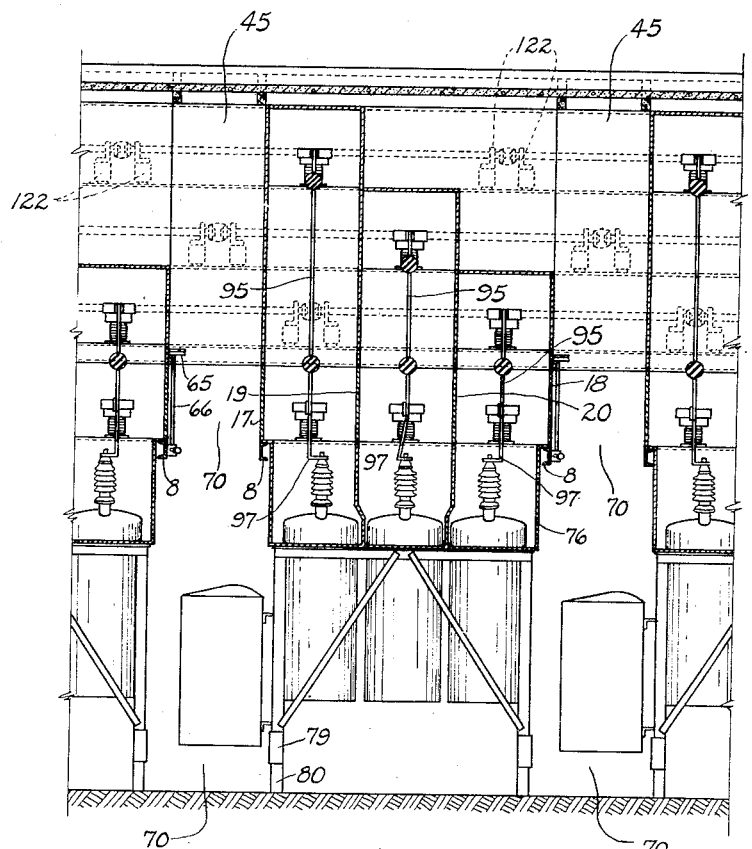
Figure 6:
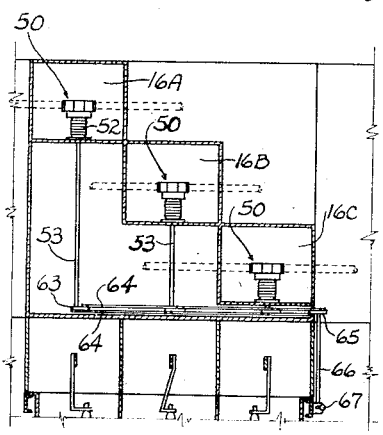

Reference may now be had to Figures 2 to 8, inclusive, showing the construction of one of the units of the station more particularly. In these figures no attempt has been made to illustrate where each sheet metal panel ends and a new sheet of metal commences, since this would needlessly encumber the drawings. Each unit is supported by vertical columns 7—7 (see Figs. 3 and 4), and beams 17—18 and beams 19—20 extending longitudinally of the unit and serving also to subdivide the same into separate compartments for the respective phases. The beams 8—8 act as skids during the transportation of the unit. All of the structure above the beams 8—8, with the exception of the bushbars, to be later described, constitute a factory-assembled construction. This includes the disconnecting switches, operating mechanism therefor, conducting connections, barriers, instrument transformers, etc. As may be seen from Figures 3 and 6, the disconnecting switch compartments 16A, 16B and 16C are spaced from one another both vertically and transversely of the unit. Each disconnecting switch compartment opens into the corresponding busbar compartment. In each busbar disconnecting compartment there is provided a busbar disconnecting switch 50. The disconnecting switches are, preferably, all of the same construction and are of the so called bayonet or plunger type wherein the movable or contact making member moves generally horizontally in a straight line from its switch open position to its switch closed position. While any bayonet type disconnecting switch may be used, the preferred type is one such as is shown in Figures 19 to 23 hereof or Figure 18 of my Patent No. 2,218,554, issued October 10, 1940, or one such as is shown in my Patent No. 2,273,069 issued February 17, 1942. The movable element of each busbar disconnecting switch is movable into and out of the corresponding busbar compartment. The switch 50 includes a stationary supporting insulator 51 and an axially rotatable insulator 52 which is rotated by a rod 53 (Figs. 2 and 6). A suitable mechanism is provided so that upon axial rotation of the insulator 52 the movable or contact making member 54 of the switch is moved in a straight line to its switch closed position. For this purpose the switch is provided, as illustrated in Figures 10 and 10A, with a movable carriage 55, a crank 56 which is secured to the top of and rotatable with the rotatable insulator 52, and a connecting rod 57 joining the crank 56 with the carriage 55. The carriage is thus moved by rotation of the crank 56 on top of the rotary insulator 52, and by its movement it moves the contact making member 54. In addition, a suitable connection is provided between the carriage 55 and the stationary part of the switch structure so that upon movement of the carriage with respect to the stationary structure the switch blade 54 is moved with respect to the carriage by a corresponding amount. The total movement of the switch blade 54 is twice as great as the total movement of the carriage. The connection between the carriage, the stationary structure, and the switch blade comprises a series of gears 58 mounted on the carriage and each meshing with a rack 59 which is a part of the stationary structure and a rack 59' which is a part of the switch blade. As the carriage is advanced, the gears roll on the stationary racks and by their rotation advance the switch blade twice the distance of travel of the carriage. During the switch opening movement the blade moves through the carriage.

An insulating barrier or plate 60 almost but not completely closes the opening between each busbar compartment and the corresponding busbar disconnecting switch compartment, said plate 60 being provided with an opening 61 barely large enough for the movable switch blade to move therethrough. The plate 60 is shown in Figure 9.

Each vertically extending operating rod 53 of the three busbar disconnecting switches on each side of the unit has a crank 63 at its bottom (Fig. 6). These cranks are interconnected by a longitudinally extending rod 64 so that upon reciprocation of the rod 64 the respective rotary insulators 52 of the respective busbar disconnecting switches on the corresponding section of the unit are operated. The rod 64 is reciprocated by a bell crank 65 that is rotated by axial rotation of a vertical shaft 66 by means of a handle 67. The handle 67, the shaft 66 and the crank 65 for each bay are located in the space 70 between bays where they are readily accessible for operation. Suitable interlocks may be provided between the handle 67 and the circuit breakers, to be hereafter described, to prevent opening or closing of the busbar disconnecting switches at any time except when the circuit breaker is open. The operating mechanism 64 extends below the lowermost busbar disconnecting switch of the C phase. The metal compartment housing the mechanism 64 is devoid of any live parts, thereby permitting safe entrance into such compartment.

The bottom wall 72 of the unit is provided with openings 73 for receiving connections to the heads of the circuit breakers 5. The opening at each section of the unit is of a sufficient length and width to receive an enclosure 76 that embraces the three separate heads of a three phase circuit breaker, as is illustrated in Figure 4. The sheet metal enclosure 76, which depends from the bottom 72 of the unit, is adapted to be connected to the unit after installation of the same. The section 76 is not present during shipment of the unit. The section 76 is provided with an opening 77 through which the heads of a three phase circuit breaker extend, as is indicated in Figures 2, 4 and 5. To mount the circuit breaker in place after the unit has been installed and before the sections 76 have been attached thereto, the breaker is moved along until it is brought into position under the opening 77, and then it is elevated into position, as illustrated in Figures 2 and 5. Thereafter it is supported in its elevated position by means of short metal sections 80—80 that are spliced to the legs of the circuit breaker by splicing pieces 79—79 so that upon removal of the sections 79 and 80 the circuit breaker may be dropped out of the unit for removal.

The bottom wall 72 of the line or circuit switching compartment 33 is provided with a central opening 82 extending crosswise of the unit and through which the circuit connections are brought, in a manner to be presently set forth. Sheet metal compartments 36 are secured to the bottom wall 72 of the unit at the center thereof and extend for the full width of the unit. The circuit compartment 36 is subdivided to provide separate incoming line compartments 84 for each phase, a potential transformer compartment 85, and separate instrument fuse compartments 86 for the respective phases. Potheads 87 extend a line or other circuit 88 into each compartment 84A, 84B, and 84C. The compartments 86A, 86B and 86C are the respective phase compartments for the potential transformer fuses. The compartment 84 is subdivided into three subcompartments, one for each phase, as indicated at 84A, 84B and 84C of Figure 7, by metal barriers 89.

The top wall of the connecting compartment 33 is extended into the current transformer compartments 22A, 22B and 22C, as indicated at 90, to provide a shelf for supporting the current transformers 27 for the respective phases.

Figure 3:
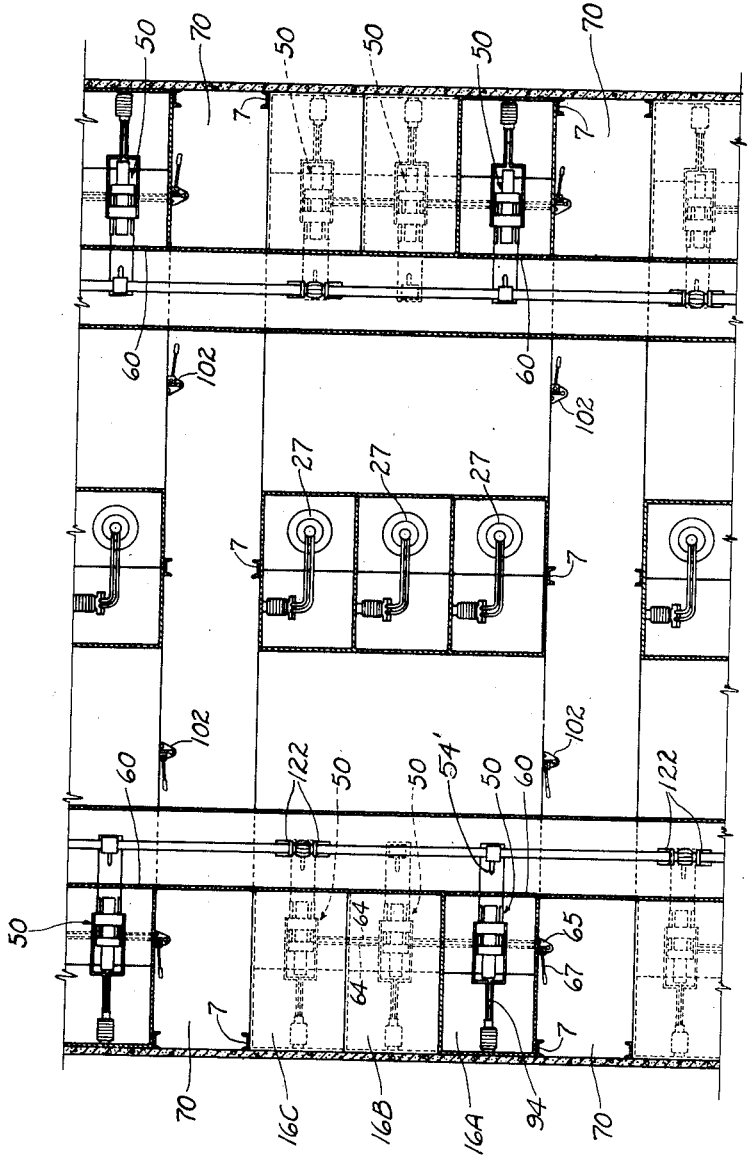

The bus disconnecting switches are connected at one side to a terminal of the circuit breakers, as indicated in Figure 2, wherein the switch 50 is connected by horizontal copper straps 94, a vertical copper bar 95 constituting a downcomer lead, and a horizontal bar 96 to a circuit breaker terminal 97, similar connections being provided for each of the other busbar disconnecting switches, as may be seen from Figures 3, 5 and 6. The other side of the circuit breaker is connected by a circuit breaker terminal 98 and connecting copper bar 99 to the line or circuit disconnecting switch 34 or 35, as the case may be. The stationary terminals of these two last mentioned disconnecting switches are connected together by the tie conductor 100. The line or circuit compartment 33 is divided into three sections, 33A, 33B and 33C, one for each phase, the respective sections being separated by the metal partitions 19 and 20 which extend the full length of the unit and constitute girders imparting rigidity to the unit. The disconnecting switches 34 and 35 are of the same construction as are the switches 50, and the insulators thereof have been given like reference numerals. The rotary insulators of the switches 34 and 35 are operated by cranks located below the bottom wall of the compartment 33 and above the bottom of the channel beams 8 and 8', as may be seen from Figures 2 and 3, the operating mechanism being indicated at 102.

In a 34.5 k. v. unit adapted to be shipped as a factory-assembled structure the busbars, indicated at 115A, 115B and 115C, for the respective phases are mounted in the busbar compartments after the unit has been installed. The insulators for supporting the busbars are, however, preferably mounted in the respective compartments at the factory. There are ordinarily two busbar supports per phase per circuit, and one longitudinal bus joint per phase per circuit. In a unit designed for lower voltages the busbars may be assembled in place at the factory.

An explanation will now be given of the circuit connections for the unit shown in Figure 2. Since the circuit connections for the three phases are identical, a description for the connections to one phase will suffice. The line or circuit extends to or from the unit, as indicated at 88, thence in the unit by way of a disconnecting switch 110 and a conductor 111 which extends upwardly to the current transformer 27. The opposite lead from the current transformer, indicated at 112, is connected to the tie conductor 100. Since the conductors 111 and 112 are at substantially the same potential they may be placed adjacent one another, but they are insulated from one another. From the tie conductor 100 the circuit extends in either direction, through one or the other of the line disconnecting switches 34 or 35 that happens to be closed, thence through the corresponding circuit breaker to the corresponding bus disconnecting switch 50 that is connected to the corresponding busbar 115A. The busbars are mounted in the respective busbar compartments on insulators and are sufficiently spaced from the surrounding metal walls of the busbar compartments to provide adequate insulation at the rated voltage with air as the intervening dielectric. The potential transformers 85' mounted in the compartments 85 are connected through a fuse 116 to a terminal 117 from which a conductor extends through the insulator 118 to the terminal to which the conductor 111 is extended, so that the potential instrument transformers are always connected to the tie conductor 100.

It is to be noted that the respective disconnecting switches and the respective conductors for each phase are separated from the corresponding disconnecting switches and conductors of the other phases by grounded metal barriers, the live parts being sufficiently spaced from one another and from the adjacent grounded parts to provide adequate insulation at the rated station voltage when air is the intervening dielectric.

In one three phase unit designed for 34.5 k. v. in accordance with the teachings of the present invention, the height from the bottom of the beams 8—8' to the top of the busbar disconnecting switch compartments, outside dimensions, was eleven feet. The overall length of each unit, exclusive of the concrete walls 40 built around the same, was twenty-nine feet, and the width of the unit in a direction lengthwise of the bay, and exclusive of the circuit breakers, was nine feet. A structure of this size can readily be shipped on a standard flat railroad car. The width of the aisles 28—29 was five feet and the height of those aisles was eight feet. This provides adequate space within which a person may walk. The adjacent metal walls of the busbar compartments, current transformer compartments and line circuit compartments 33 are made in panels which may be individually removed for inspection or repairs of the parts within the respective compartments. The unit is shipped with the busbar supporting insulators already mounted in place, of which there are two for each busbar, as indicated at 122 and 123 (Figs. 2 and 5). The busbars are shipped separately to be installed after units for adjacent bays have been assembled.

Because the operating mechanism of the standard type of oil circuit breaker is located at the end of the breaker, the overall length of the oil circuit breaker is greater than the longitudinal requirements of the high voltage electrical connection. Advantage is taken of this fact to provide a working space between adjacent circuits or bays of the station. This space is indicated at 70 in Figures 3, 4, 5 and 7. This space permits access to the operating mechanisms of the circuit breakers, access to the second floor, space for bringing out the operating rods of the disconnecting switches to suitably located handles, and openings for light and ventilation.

The present design also provides aisle space sufficiently wide to permit passage of the oil circuit breakers after the housing units have been installed. By removing the lower eighteen inches of the legs of the oil circuit breaker supporting framework, as indicated at 79, the breaker can be lowered and moved to the desired position.

It is to be noted that the path of the movement of the switch blades of the respective busbar disconnecting switches is in line with the path of the main current carrying parts and directly across the path of the respective busbars. By this arrangement the stationary contact of each busbar disconnecting switch may be mounted directly on the corresponding busbar.

As previously stated, the switch blade 54 moves horizontally in a straight line from its open to its closed position. While the switch blade herein illustrated has a true straight line motion it is not essential that the motion be accurately along a straight line, as certain deviations from a true straight line motion are permissible. It is only essential that the moving parts which are at a potential other than ground potential shall not, during the switch operating movement, come so close to any of the grounded parts of the compartment, or so close to parts at a different potential, as to result in an unsafe electrical condition. For instance, in the preferred construction, illustrated in Figures 19-23, the switch blade is actuated by a rocking insulator rather than by an axially rotating insulator. Care must be taken that the rise or fall of any of the parts of the blade during the switch operating movement, or upon completion of the switch operating movement, shall not be of an appreciable magnitude, for if it were of an appreciable magnitude then the switch compartment would have to be correspondingly enlarged to afford the same degree of safety. It is important that during the switch operating movement there be no flexible or other conductors which may bow into a position appreciably closer to the grounded parts of the compartment when the switch is open than when the switch is closed, for if that is the case the compartment would have to be correspondingly larger to afford adequate clearance distance between the bowed conductor and the other parts of the switch unit.

As previously stated, the switch blade 54 engages a stationary terminal on the bus when the switch is in its closed position. This terminal is indicated by the reference numeral 54' in Figures 2 and 3. The connection to the switch blade at its actuated end may be in the manner illustrated in my pending applications above referred to, that is, by means of a laminated belt which is maintained taut at all times and which connects the switch blade with the stationary structure. On the other hand, if desired, the electrical connections to the actuated end of the switch blade may be by means of one or more stationary contact members or clips 54A mounted on the stationary part of the blade supporting structure and adapted to embrace the blade 54 when the same is in its switch closed position, as illustrated in Figure 10A. The contact clips 54A are permanently electrically connected with the copper straps 94 that extend the circuit to the switch blade. There are no loose conductors extending the circuit to the switch blade, and the position of every movable part of the switch is under positive control throughout the entire movement of the switch blade. This includes the conducting means for extending the circuit to the switch blade, whether the switch be of the kind wherein the blade interrupts the circuit at one place or at a plurality of places.

By the provision of the insulating plates or barriers 60 at right angles to the path of movement of the busbar disconnecting switch blades the disconnecting switch compartments can be almost completely isolated from the busbars. This barrier is located close to the position occupied by the tips of the movable contacts when they are in the switch open position. In this position the switch contacts partially obstruct the opening through which the blade is movable, thus effectually isolating parts of the disconnecting switch in its chamber and in the chamber which houses the oil circuit breaker terminals, from the stationary contacting member of the disconnect switch and the bus. With this arrangement, when the oil circuit breaker and the disconnecting switch is open, all of the movable parts of the disconnecting switch and all of its spring backed contact parts can be inspected and handled with safety. Thus all of the parts of the disconnecting switch which ordinarily require inspection, lubrication and maintenance can be completely isolated from the live parts without killing either the busbars or a circuit which may have a back feed from an outside source of power.

Grounding or testing leads can be attached to the downcomer leads 95 between the oil circuit breaker and the busbar disconnecting switches. Then with the busbar disconnecting switches open and the circuit disconnecting switches 34 or 35 closed the grounding or testing connection can be established on the circuit leads through the oil circuit breaker. Alternatively, the movable member 54 of each busbar disconnecting switch can be provided with a shank sufficiently long to enter permanently installed grounding or testing clips when the switch is in its disconnecting position.

As may be seen from Figures 2 and 4, the openings 77 through which the bushings of the oil circuit breaker extend are of sufficient size to permit raising and lowering of a circuit breaker of the type having inclined bushings. A breaker with inclined bushings does not require as large a tank as is required by one having vertically extending bushings, which is the usual type on circuit breakers that are lowered bodily to isolate them from the circuit connections.

It will be apparent from an inspection of the station thus far described that one or more additional stories can be superimposed on the unit illustrated in Figure 2 to permit the installation of a second circuit within the same ground area.

In Figure 11 I have shown an alternative arrangement for the instrument transformer compartments. This arrangement is particularly applicable in a bay having a main and a transfer bus and one circuit breaker per circuit. In this construction the outside line or circuit connection 88 extends into the unit as before, but here the line 111' from the disconnecting switch 110 extends through the current transformer 27', connected in series, to the line section 140. The potential instrument transformer compartment is located above the compartment 33, and the transformers therein are connected through insulating bushings 136 into separate compartments for the three phases, thence each phase extends through a bushing 137, a fuse 138 and an insulating bushing 139 to the live conductor at one side of the current transformer 27'. The conductor 140 extends to the circuit breaker, while the conductor 141 extends to the transfer bus. The line disconnecting switches 34—35 of Figure 2 are entirely omitted from the compartment 33. The line is connected to the conductor 141 through a disconnecting switch 110' and an insulating bushing 142 through which a connecting conductor extends.

In Figure 12 I show still another arrangement wherein a conductor corresponding to the conductor 100 of Figure 2 interconnects two disconnect switches like the switches 34—35 of Figure 2 and in the same manner illustrated in Figure 2. The current transformer 27' and the potential instrument transformer compartment 85, and the connections to the transformers therein are arranged in the same manner as in Figure 11.

In Figure 13 I illustrate a double bus arrangement provided with only one circuit breaker. In this construction similar reference numerals have been used to indicate parts similar to those of the constructions previously described. The line disconnecting switches 34—35 of Figure 2 have been omitted entirely. The busbar disconnecting switches for corresponding phases on the two sides of the unit are interconnected by tie conductors 145, one for each phase, each in a separate metal compartment, the conductors 145 connecting with the downcomer leads 95 of the corresponding phases. In this construction the circuit extends from the line 88, through the current transformer 27, the circuit breaker 5, and downcomer leads 95, thence, for each phase, either through the conductor 94 to the adjacent busbar disconnecting switch, or through the conductor 145 to the corresponding busbar disconnecting switch on the opposite side of the unit. The height of the unit is increased a small amount to provide space for the compartments through which the conductors 145 pass, but in many cases this height still leaves the unit of a size to permit shipment thereof on a flat railroad car within standard railway clearance dimensions.

Figure 14 shows a diagrammatic arrangement corresponding to Figure 2, except that there is only one circuit breaker and that the disconnecting switches 34—35 have been omitted. This construction provides for interconnection of the buses on opposite sides of the unit through a circuit breaker in another bay so that the bus at the left hand side of the figure may constitute the main bus and the bus at the right hand side of the figure constitute the transfer bus. The line may be connected to the main bus through the circuit breaker or to the transfer bus directly, without the use of a circuit breaker.

Figure 15 shows, diagrammatically, an arrangement which corresponds to a combination of Figures 13 and 14. This construction provides a double bus, indicated at 150 and 151, each bus bar of each bus being provided with a set of disconnecting switches, as previously set forth, the two sets of disconnecting switches for the double bus being interconnected by a set of conductors 145, as in Figure 13. In addition there is provided a transfer bus 148, the respective phases of which are connected by conductors 153 and disconnecting switches 154 to the line or circuit 88.

It is to be understood that the circuit connections for the center compartments, as illustrated differently in Figures 2, 11 and 12, are mutually interchangeable in each of the circuits indicated in Figures 2, 13, 14 or 15.

In Figures 16 to 18 inclusive, there is illustrated a modification of the switchgear of Figure 2 the essential difference consisting in placing the potential transformer 85' of Figure 2 in a compartment adjacent the current transformer compartment and shifting the latter compartment accordingly. Another difference consists in the provision of a somewhat different type of disconnecting switch. Insofar as the structure of Figures 16 to 18 is the same as that of Figure 2 identical reference numerals have been used and a further description thereof need not be made at this time. The busbar compartments, disconnecting switch compartments and line connecting compartments are of the same construction and arrangement as in the switchgear of Figure 2. In this construction the instrument transformer compartment corresponding to the compartment 22A of Figure 2 in effect comprises two sections, one of which houses the current transformers 27, and the other of which houses the potential transformers 85'. One section constitutes three current transformer compartments 201, one for each phase, the compartments being separated by metallic side walls 293 and 294. A metallic wall 205 divides the current transformer compartments from the potential transformer compartment 202. The compartments for housing the current transformers and the potential transformers are located centrally between the busbar compartments of the sections 10 and 11. The line circuit compartment 36 is located centrally of the unit, below the line connecting compartments 33. The line circuit 88 extends into the compartment 36 through a pothead or the like 87, and is connected to one terminal of the switch 110 as in the structure of Figure 2. The conductor 111 extends from the opposite terminal of the switch 110 to one terminal of the current transformer 27, being supported within the compartment 33 by an insulator 207 and being supported within the compartment 201 by insulators 209. The conductor 112 extends from the opposite terminal of the current transformer 27 (Fig. 18) and establishes connections to the tie conductor 100 that interconnects the two disconnecting switches 34' and 35'. These switches perform the functions of the switches 34 and 35 of Figure 2 but are structurally of somewhat different construction from that illustrated in Figures 2 and 10. These disconnecting switches are of a construction similar to that illustrated more fully in Figures 19 to 22 inclusive, which will be more fully described as this description proceeds. Short conductors 208 extend from one terminal of each current transformer 27 to the primaries of the step down potential transformers 85' in series with a resistor 210 and a fuse 211 within an insulator that extends through the wall 205.

The busbar disconnecting switches 50' for the respective phases are located in the same positions as are the switches 50 of Figure 2. Structurally they are of the type illustrated in Figures 19 to 22. Functionally they are the same as the switches 50 of Figure 2 in that they include a switch blade which is maintained parallel to itself as it moves from the switch open to the switch closed position, the movement being in a direction substantially longitudinally of the blade. These switches are actuated by a rocking insulator rather than by an insulator which is axially rotatable, as in the case of the disconnecting switches of Figure 2.

The top metallic plates 212—213 above the switches 34' and 35' are removable to permit access to the switches as may become necessary for installation, replacement or repair. The barriers 69 at the switches 34 and 35 of Figure 2 have been omitted from the switchgear of Figure 16 although it is to be understood that they may be provided if desired.

A description will now be given of the construction and mode of operation of the disconnecting switches of the switchgear of Figure 16.

For this purpose reference may be had to Figures 19 to 24 illustrating one of the busbar disconnecting switches 50'. This switch comprises a grounded frame or base 251 on which are mounted stationary insulators 252 and 253, and a rocking insulator 254, which rocks about a stationary pivot or axis 254'. The insulator 252 supports one of the buses, as for instance, the bus 115A. For this purpose the insulator 252 has a clamp 255 of bronze or other metal of high electrical conductivity bolted or otherwise suitably secured to the insulator cap and a mating bronze or other conducting clamp 255' bolted to the clamp 255 by four bolts. The clamp parts 255 and 255' have cylindrical clamping surfaces which together embrace the tubular bus 115A. Braided copper or other conducting straps 256 interconnect the two clamps 255 and 255' so that current can flow from the bus to the clamp 255' and thence to the clamp 255. The clamp 255 has a contact stud 257 formed as an integral part thereof. The forward end of the contact stud is circular in cross section, as may be seen in Figure 19. This contact stud is adapted to be engaged by the switch blade. The insulator 253 supports a terminal 258 having a cylindrical contact stud 259 engaged by the switch blade. The switch blade comprises two similar blade members 260 and 261 clamped together to embrace the contact stud 259, and pivotally supported at the end of the rocking insulator 254, as will be more fully set forth as this description proceeds. The blade 260 comprises a number of loops of wire, in this instance three, nested together. Each wire may comprise a solid copper rod, or a hollow copper tube, or a copper tube or jacket around a core of steel, or bronze, or other material having the requisite strength and resiliency. The outer jacket may be of high conducting material other than copper as, for instance, bronze. The inner core does not necessarily have to be solid. It may also be in the form of a tube over which the outer jacket fits snugly. If desired, the wire including the outer jacket and the core may be formed and drawn as one integral wire so that the jacket is welded to the core throughout the entire surfaces of contact between the jacket and the core. By making the core tubular, rather than solid, any desired ratio of cross section of core to cross section of copper jacket may be obtained with any given jacket.

Each loop of the switch blade 260 includes upper and lower inclined contact making portions 263—264, a straight or horizontal portion 265, and circular or curved portions 266 and 267 and a curved portion 268 merging the inclined portion 264 with the curved portion 266. Adjacent the forward end, the blade members 260—261 are secured together and in properly spaced relation with respect to the stud 257 by means of clamping bars 270—270, a spacer 271, and bolts 272—273. The bolt 273 also serves as a pivotal support for the forward end of the blade, said bolt being supported between a pair of arms 274—274, of a U-shaped fitting or clevis that is bolted or otherwise rigidly secured to the top of the rocking insulator 254. The clamp bars 270 and the spacer 271 secure the forward ends of the two switch blades a distance apart slightly less than the diameter of the contact making portion of the stud 257.

The blade members 260—261 embrace the stud 259 and are guided in their movement by an upper pin 277 and a lower pin 278 extending through the stud. The horizontal portions 265 of the blades are secured together in properly spaced relationship by clamps 280—280, a spacer 281, and bolts 282—283. It is to be noted that the clamp 280 is at an angle to the wires of the blade. This angle is so chosen that the length of the wire of the innermost loop 284, between the clamp 280 and the stud 259 is equal to the length of the outermost loop between the clamp 280 and the stud 259. In both instances the distance to the stud is measured to the place where the wire engages the stud. By this arrangement the pressure exerted against the stud 259 by the outermost wire of the loop is the same as the pressure exerted against the stud by the innermost wire, as well as by the intermediate wires.

The radius of curvature of the outermost loop at 266 is equal to the radius from the center 254' to the pivot point 273. The center of curvature is indicated at 288. The arcs 266 of each of the inner loops of wires are arcs of circles about the same center 288.

When the insulator 254 is rocked about the center 254' in a clockwise direction to open the switch it causes the blades 260—261 to move to the right, as seen in Figure 20. As the point 273 rises from the base 251, causing a rise of the switch blade, the right hand end of the blade rises on the pin 278 an exactly equal amount so that the portion 265 of the blade remains substantially horizontal. When the rocking insulator reaches its vertical position the lowermost part of the arcuate portion 266 is resting on the pin 278. Subsequent turning of the insulator 254 causes the point 273 to follow a circular curve which now approaches the base 251. At the same time, the arcuate portion 266 rides downwardly on the pin 278 an equal distance, so that the portion 265 still remains horizontal. This result is obtained by making the radius of curvature from 288 to the curved portion 266 equal to the radius from 254' to 273, as previously stated, and locating the center 288 in such a position that the four points 278, 254', 273, and 288 constitute the corners of a parallelogram. The switch blade therefore moves always parallel to itself so that the part 265 always remains horizontal when the switch is mounted in the position illustrated in Figure 20.

The contact-making ends of the blades, comprising the straight inclined wire portions 263—264, are outwardly flared at their forward end, as may be seen from Figure 19, to guide the switch blade over the contact stud 257. The respective inclined wire portions 263—264 are flexed outwardly by the contact stud 257, since the diameter of the stud is greater than the width of the spacer 271. Due to this flexing, the respective wires exert a spring pressure against the contact stud when the switch is in its closed position. Likewise, the ends of the blades that are on opposite sides of the stud 259 exert a spring pressure against the stud 259. Current therefore flows from the stud 259, through the upper and lower parts of each blade, to the stud 257. The mean effective length from the stud 259 to the stud 257 over the upper half of the loop is approximately the same as over the lower half of the loop.

As the switch moves to its switch open position, the blades slide on opposite sides of the stud 259. In order to ease the operation of the switch, it is desirable that the pressure of the blades against the stud 259 should be released after the blades have separated from the opposite stud 257. This is accomplished by forming a slight indentation in each of the wires at its point of engagement with the stud 259, as is illustrated more fully in Figure 24. As may be seen from this figure, each of the wires projects inwardly towards the stud a small amount, as indicated at 290. This amount may be of the magnitude of the order of $\frac{1}{16}$ of an inch. As the switch blade is operated towards its switch closed position, the wires loosely embrace the stud 259 until the forward end of the blade engages the stud 257. At that time, the inward projections 290 engage the stud 259 and thereby exert their pressure against this stud. This acts as a shock absorber tending to reduce the impact of the moving parts against the stud 257 and consequent shock on the insulator 252. During the switch opening operation the reverse action takes place, the pressure of the blades against the stud 259 being released when the blades have moved sufficiently to cause the projections 290 to clear that stud.

The support for the rocking insulator 254 comprises a pair of bearings 291—291 secured to the base 251. Short cylindrical trunnions 292 are journaled in the bearings 291 and are joined by a plate 293 which is integral with the trunnions although it may be removably bolted thereto. The plate 293 supports the insulator 254. The trunnions 292 have aligned square openings therein for receiving a square shaft 295 which is secured to the trunnions in any desired manner, as by U bolts 296. Rocking of the shaft causes the trunnions 292 to rock in the bearings 291 and thus rock the insulator 254.

Throughout the entire movement of the blade between its alternate positions the inclination of the blade does not change, the blade always remaining parallel to its initial position. The path of motion of the blade is along a circular arc, but due to the small angular movement of the insulator 254 and the unchanging inclination of the blade the effective motion of this blade is the same as that of the blade of Figure 10. In a switchgear of the type of the present invention this motion is in effect a motion substantially lengthwise of the individual switchgear unit or substantially lengthwise of the bay of the station.

In the case of the switch 34'—35' (Fig. 16) the insulator 252 does not support a busbar. Instead the clamp 255 is replaced by a terminal lug that is secured to the insulator 252 and has a contact stud like that at 257 of Figure 20. In the case of the switches 34' the shaft 295 interconnects the three aligned switches 34' of the respective phases. The same interconnection is provided for the three aligned switches 35'.

It is to be understood that the switch illustrated in Figures 19 to 24 may also be used on the switchgear illustrated in Figures 1 to 15. Also the disconnecting switches of Figures 1 to 15 may be used in a switchgear such as illustrated in Figures 16 to 18, without departing from the spirit of the present invention.

Reference may now be had more particularly to Figures 25, 26 and 27 showing the principles of the present invention as applied to an open type of station. In this station the busbars, disconnecting switches and other equipments are in general unenclosed. In order to maintan a high degree of safety the spacings between live equipment and other live or grounded parts has been increased somewhat. Due to the increase in spacing requirements certain other changes, which will be more fully set forth as this description proceeds, have been made in order to permit shipment of the unit in as completely assembled form as possible within the limits imposed by the necessity for railroad clearances. The station includes an open structural steel frame work supporting the various disconnecting switches, instrument and metering transformers, busbars and the like. In the main structural members comprise 2" by 2" steel angles $\frac{3}{16}$" thick, although, of course, other structural shapes and sizes may be used. The disconnect switches used in the sub-station illustrated in these figures are of a construction such as illustrated in Figure 20, although it is to be understood that it is within the purview of the present invention to use other types of disconnecting switches wherein the movable member has a substantially straight line plunging movement and wherein there are no loops or wires that are free to move to a position approaching a part of the structure which is grounded or at a different potential.

The station comprises a number of units each constituting one bay of the station, the units being in alignment so that the busbars extent in a straight line from bay to bay, and the units being spaced apart to afford a passageway between bays, as in the station of Figure 1, previously described. A description of one unit or bay of the station will be given, it being understood that adjacent bays are of like constructions. The unit illustrated in Figures 25 to 27 inclusive, comprises an open steel truss frame work providing open compartments or spaces for receiving the various disconnecting switches and the various busbars, the preferred arrangement being such that the space for each busbar and the space for each phase disconnecting switch is separated from the space for other busbars or disconnect switches of other phases by the grounded open metal frame work. The frame work supports the various disconnecting switches, busbars, instrument and metering transformers, etc. The metering and instrument transformers are located at the center of the unit, and the unit is symmetrical on each side of those transformers, the two sides of the unit being of identical construction. The unit is supported at a suitable elevation on four legs 301, one at each corner of the station. The lower part of the frame work comprises upper and lower structural steel members 302 and 303 which extend across the station, that is, lengthwise of each bay, and are secured together by diagonal or cross braces 304 and vertical struts 305 to form two trusses 306 extending lengthwise of the unit at opposite sides on the bottom of the unit. Between these two trusses are located the line or circuit disconnecting switches 34' and 35' which correspond functionally to the switches 34—35 of the station of Figure 1 previously described. The switches 34'—35' are provided in three sets, one set for each phase, as in the previously described station, the switches for each phase being in alignment lengthwise of the unit, and the corresponding switches for the different phases being in alignment transversely of the unit. To support the switches, L-shaped or angle bars 307—308 extend between and are secured to the lower structural steel members 302. The base 251 of each disconnecting switch rests upon the angles 307—308 and is supported thereby. The line disconnecting switches 34'—35' are rigidly secured to the steel frame work and constitute a part of the factory assembled unit. The trusses 306 are additionally interconnected at their ends by upper and lower horizontal cross braces 310 and diagonal braces 311 respectively. The bars 307—308 help to impart rigidity to the trussed structures at the base thereof, and similar cross members, to be presently described, extend between trusses at the top thereof and further impart rigidity to the structure.

The tops of the trusses 306 are further interconnected at the level of the top braces 310 by cross members 314 (Fig. 26) each of which constitutes also a support for one end of the lowermost or "C" phase bus disconnecting switch 50'. Two channel members 316—316 extend between and join the tops of the trusses 306 and support the current transformers 27. Similar cross channel members 317—317 further connect and brace the trusses 306, and support the potential metering and instrument transformers 85'.

The unit is further completed by trussed steel frames 320 on opposite sides of the unit, extending upwardly from and secured to the trusses 306—306 and constituting supports for the "A" and "B" phase busbars, and busbar disconnecting switches. Each trussed frame 320 constituting a side of the unit above the trusses 306, is also an open frame, made of structural shapes such as angle members. These trusses 320 are mounted on and permanently secured to the tops of the trusses 306 and are interconnected adjacent their top by cross bars 322—323 on each side of the unit and a cross bar 324 at the center of the unit. The cross bar 323 supports one end of the "A" phase busbar disconnecting switch, the opposite end being supported by a diagonal cross bar 330 connecting the trusses 320 at the top of the frames. A similar diagonal cross bar is located directly beneath the cross bar 330 at the level of the top of the trusses 306. A diagonal cross brace 331 connects the trusses 320—320 at the inner side of the space reserved for busbars, namely, at the side 332, and also at the center 333 of the unit, that is immediately under the horizontal cross bars 323 and 324. This is in addition to the vertical members at these same places which constitute parts of the respective trusses 320.

Between the spaces for the busbars and the space for the current transformers 27 there is provided an aisle or passageway 340. A similar aisle or passageway 341 is provided between the busbars on the opposite side of the unit and the potential instrument or metering transformers 85'. These passageways are of a size to permit a man to walk therethrough, and are provided with gratings 342 constituting the floors of the passageways. The opposite sides of the passageways are open but contain the vertical and diagonal cross members that are grounded, so that there is sufficient grounded metal on opposite sides of the passageways for safety. In addition, removable grounded metal vertically extending screens are located on opposite sides of the passageways.

It is to be noted that the busbars 115a, 115b and 115c extend horizontally parallel to one another at different vertical levels, as in the stations previously described. These busbars are also displaced from one another in a horizontal direction. The "A" phase busbar disconnecting switch is mounted on top of the trusses 320—320 whereas the "B" phase disconnecting switch is mounted between the top and bottom of these trusses, being supported on cross members that extend between the trusses 320—320. These busbar disconnecting switches are spaced vertically from one another the same as are the busbars, and are also displaced from one another in horizontal direction at right angles to the busbars, as may be seen from Figure 25, and are displaced from one another in a direction parallel to the busbars, as may be seen from Figures 26 and 27.

The circuit connections between the circuit breakers and the line disconnecting switches and the busbar disconnecting switches are substantially the same as in the station of Figure 1, or Figure 16 previously described. The circuit breakers are supported apart from the switching unit, as in the station of Figure 1, with the bushings of the breakers extending above the bottom of the trusses 306, as is apparent from Figure 25. In this station there is shown an overhead line wire 350 connected to the station by a conductor 351 extending into the station from above. The connections from the conductor 351 to the switches 34'—35' are substantially the same as in the station illustrated in Figure 16 except that the connections extend from above instead of from below. To that effect the conductor 351 extends downwardly and then horizontally at 352 (Fig. 26) to one terminal of the current transformer 27. From the opposite terminal of the current transformer 27 a conductor 353 extends to a vertical conductor 354 (Figs. 25 and 26) extending to both line disconnecting switches 34'—35'. It is, of course, to be understood that the station illustrated in Figure 25 can be arranged to receive line connections from an underground line instead of from an overhead line. Such connections would be made in a manner illustrated, for instance, in Figure 16.

The busbars for the respective phases are supported by a stationary insulator of the corresponding busbar disconnecting switch as in the stations previously described. In addition the busbar for the "A" phase is supported by an insulator 345 above the "C" phase busbar disconnecting switch, and the "C" phase busbar is supported by an insulator 346 below the "A" phase busbar disconnecting switch. The "B" phase busbar is additionally supported by insulators 347 located between adjacent bays of the station. For this purpose the respective units are provided with cross connecting supports 348 at the level of the "B" phase only.

The three busbar disconnecting switches on each side of the unit are interconnected for joint operation. For this purpose the switch operating shaft 295 of each busbar disconnecting switch projects transversely of the unit to the outside thereof. These shafts are each provided with a crank 357, the cranks being interconnected by a switch operating rod 358. Reciprocation of the rod 358 results in rocking of the rocking insulators of the connected busbar disconnecting switches. In the case of the three line disconnecting switches 35', the shaft 295 extends continuously between the switches to the bay and is oscillated by a crank 360 (Fig. 26) in the space between adjacent units. The interconnected busbar disconnecting switches and the interconnected line disconnecting switches may be operated in any desired manner.

The busbars are not included in the factory assembled unit, being assembled, instead, at the place of installation of the unit. For shipment within railroad clearance dimensions the electric equipment above the top of the trusses 320, that is, the "A" phase disconnecting switches and the other insulators above the trusses 320 are excluded from the factory assembled unit. The rest of the structure, exclusive of the circuit breakers, may be assembled at the factory. If the unit is then still too wide for shipment, the three pole disconnecting switch operating rods which project outside of the shipping width may be removed or telescoped in place.

From the description thus far given it is apparent that the principles of the switchgears embodied in the various modifications herein shown and described are interchangeable. For instance, the open type frame work of the switchgear of Figure 25 can be used in the structure of Figure 1, with or without the enclosing housing 40—41. Also, if desired, the station of Figure 25 may be enclosed in a housing built around the respective units, in the manner illustrated in Figure 1, to constitute a housing supported by the uprights 301. It is also within the province of the invention to use disconnecting switches of either of the types herein shown in any of the stations herein shown.

In compliance with the requirements of the patent statutes I have here shown and described a few preferred embodiments of the present invention. It is, however, to be understood that the invention is not limited to the precise constructions herein shown, the same being merely illustrative of the principles of the invention. What is considered new and desired to be secured by Letters Patent is:

1. An outdoor polyphase bus and switching station including a stationary supporting structure comprising an open structural framework, horizontally extending parallel busbars for the respective phases supported thereby, each busbar having a disconnecting switch individually associated therewith which is secured to the stationary structure and includes a contact making member movable in a direction substantially at right angles to a vertical plane determined by the center line of a busbar, with all of the movable conducting parts of the switch having controlled positions throughout the entire switch-opening operation of the contact making member, and each busbar having a switch contact thereon engaged by the contact making member of the associated switch in its switch closed position.

2. An outdoor bus and switching station including a stationary supporting structure comprising an open structural framework, horizontally extending parallel busbars supported thereby, each busbar having a disconnecting switch individually associated therewith which is secured to the stationary structure and includes a contact making member movable substantially at right angles to its associated busbar, and each busbar having a switch contact engaged by the contact making member of the associated switch in its switch closed position, the switches being spaced from one another in a direction parallel to the busbars, and means forming a compartment for each busbar and its disconnecting switch.

3. A bus and switching station comprising a stationary supporting structure, horizontally extending parallel busbars supported by the stationary structure at different levels, each busbar having a disconnecting switch associated therewith which is secured to the stationary structure and includes a contact making member movable substantially at right angles to its associated busbar, and each busbar having a switch contact engaged by the contact making member of the associated switch in its switch closed position, the switches being spaced vertically of one another substantially the same as the vertical spacing between busbars, and being also spaced from one another in a direction parallel to the busbars.

4. An outdoor bus and switching station comprising a stationary supporting structure comprising an open structural framework, horizontally extending parallel busbars supported by the stationary structure at different levels, each busbar having a disconnecting switch associated therewith which is secured to the stationary structure and includes a contact making member movable substantially at right angles to its associated busbar, and each busbar having a switch contact engaged by the contact making member of the associated switch in its switch closed position, the switches being spaced vertically from one another substantially the same as the vertical spacing between busbars, and means forming a compartment for each busbar and a compartment for each disconnecting switch, each disconnecting switch compartment opening into the associated busbar compartment.

5. A bus and switching station having a stationary structure including means forming an enclosed busbar compartment, a busbar therein, means forming a disconnecting switch compartment, said switch compartment opening into the busbar compartment, a disconnecting switch secured to the stationary structure within said disconnecting switch compartment and including a switch blade movable in a direction substantially lengthwise of the blade.

6. A bus and switching station having a stationary structure including means forming an enclosed busbar compartment, a busbar therein, means forming a disconnecting switch compartment, said switch compartment opening into the busbar compartment, a disconnecting switch secured to the stationary structure within said disconnecting switch compartment and including a switch blade movable into the busbar compartment in a direction substantially lengthwise of the blade, the current carrying parts of said switch being sufficiently spaced from the walls of the compartment to provide adequate insulation with air as at least the major part of the dielectric when the station is operated at its rated voltage.

7. A bus and switching station comprising horizontally extending parallel busbars, each busbar having a disconnecting switch associated therewith which includes a switch blade, and each busbar having a switch contact associated therewith which is engaged by the blade of the associated switch in its switch closed position, and an enclosure for all of the busbars and disconnecting switches, said enclosure including partitions forming separate compartments for each busbar and for each disconnecting switch, a second disconnecting switch associated with each one of the first mentioned disconnecting switches, means forming separate compartments for each of the second mentioned switches, said last mentioned switches being within said enclosure, said enclosure having communicating passageways between each pair of associated disconnecting switches, and circuit breaker connections through the passageways to the respective disconnecting switches.

8. A bus and switching station including a stationary supporting structure, horizontally extending parallel busbars supported thereby at different levels, each busbar having a disconnecting switch associated therewith which is secured to the stationary structure and includes a contact making member movable substantially at right angles to its associated busbar, and each busbar having a switch contact engaged by the contact making member of the associated switch in its switch closed position, the switches being spaced vertically of one another substantially the same as the vertical spacing between busbars, and means for moving the contact making member in substantially a straight line from its switch closed position to its switch open position.

9. A bus and switch unit including a stationary supporting structure and busbars and disconnecting switches mounted in said structure and of the type wherein the busbars are spaced from one another and from parts at different potentials by an amount sufficient to provide adequate insulation with air as at least the major part of the dielectric when the station is operated at its rated potential, said unit being of a size to permit shipment thereof as a factory assembled structure exclusive of the busbars, said unit including means for imparting rigidity thereto and including means for supporting busbars extending transversely of the unit, the disconnecting switches extending lengthwise of the unit and spaced from one another in directions vertically and transversely of the unit, said disconnecting switches being a part of the factory assembled unit, each of said switches including a contact making member and means for moving the same in a direction substantially lengthwise of the unit from the switch closed position to the switch open position.

10. An enclosed bus and switching unit including a stationary supporting structure and busbars and disconnecting switches mounted in said structure and of the type wherein the busbars are spaced from one another and from parts at different potentials by an amount sufficient to provide adequate insulation with air as at least the major part of the dielectric when the station is operated at its rated potential, said unit being of a size to permit shipment thereof as a factory assembled structure exclusive of the busbars, said unit including means for imparting rigidity thereto and including busbar compartments extending transversely of the unit and including disconnecting switch compartments extending lengthwise of the unit, said disconnecting switch compartments being spaced from one another in directions vertically and transversely of the unit and opening into the respective busbar compartments, and disconnecting switches mounted in the switch compartments of the factory assembled unit, each of said switches including a contact making member and means for moving the same in substantially a straight line from its switch closed position to its switch open position, said bus and switching compartment being provided in two similar spaced sets one on each side of the unit.

11. An enclosed bus and switching unit including a stationary supporting structure and busbars and disconnecting switches mounted in said structure and of the type wherein the busbars are spaced from one another and from parts at different potentials by an amount sufficient to provide adequate insulation with air as at least the major part of the dielectric when the station is operated at its rated potential, said unit being of a size to permit shipment thereof as a factory assembled structure exclusive of the busbars, said unit including means for imparting rigidity thereto and including busbar compartments extending transversely of the unit and including disconnecting switch compartments extending lengthwise of the unit, said disconnecting switch compartments being spaced from one another in directions vertically and transversely of the unit and opening into the respective busbar compartments, and disconnecting switches mounted in the switch compartments of the factory assembled unit, said bus and switching compartments being provided in two similar spaced sets one on each side of the unit, and means forming an instrument transformer compartment between the two sets and spaced from both of the sets to form aisles of sufficient width for a person to pass therethrough.

12. An enclosed bus and switching unit of a size and construction to permit shipment thereof as a factory assembled structure, said unit having means to impart rigidity thereto for shipment and including means forming busbar compartments, disconnecting switch compartments and instrument transformer compartments, said busbar compartments and disconnecting switch compartments being of a size to allow sufficient spacing between parts at different potentials to provide adequate insulation with air as at least the major part of the dielectric when the unit is at its rated voltage, the bottom of the unit being open, terminals adjacent the open bottom of the unit for receiving circuit breaker connections from below the unit, said factory assembled unit including disconnecting switches within the respective disconnecting switch compartments; and conductors from the switches to the terminals for establishing electrical connections to the switches.

13. An enclosed bus and switching unit of a size and construction to permit shipment thereof as a factory assembled structure, said unit having means to impart rigidity thereto for shipment and including means forming busbar compartments, disconnecting switch compartments and instrument transformer compartments, said busbar compartments and disconnecting switch compartments being of a size to allow sufficient spacing between parts at different potentials to provide adequate insulation with air as at least the major part of the dielectric when the unit is at its rated voltage, the bottom of the unit being open, terminals adjacent the open bottom of the unit for receiving circuit breaker connections from below the unit, said factory assembled unit including disconnecting switches within the respective disconnecting switch compartments; and conductors from the switches to the terminals for establishing electrical connections to the switches, the instrument transformer compartments being located centrally of the unit, and the busbar and disconnecting switch compartments being located on both sides of the instrument transformer compartments.

14. An enclosed bus and switching unit of a size and construction to permit shipment thereof as a factory assembled structure, said unit having means to impart rigidity thereto for shipment and including means forming busbar compartments, disconnecting switch compartments and instrument transformer compartments, said busbar compartments and disconnecting switch compartments being of a size to allow sufficient spacing between parts at different potentials to provide adequate insulation with air as at least the major part of the dielectric when the unit is at its rated voltage, terminals adjacent the bottom of the unit for receiving circuit breaker connections from below the unit, said factory assembled unit including disconnecting switches within the respective disconnecting switch compartments; and conductors from the switches to the terminals for establishing electrical connections to the switches, the instrument transformer compartments being located centrally of the unit, and the busbar and disconnecting switch compartments being located on both sides of the instrument transformer compartments and sufficiently spaced from the instrument transformer compartments to provide aisles on both sides of the instrument transformer compartments of a width sufficient to permit a person to walk in said aisles.

15. An enclosed bus and switching unit of a size and construction to permit shipment thereof as a factory assembled structure, said unit having means to impart rigidity thereto for shipment and including means forming busbar compartments, disconnecting switch compartments and instrument transformer compartments, said busbar compartments and disconnecting switch compartments being of a size to allow sufficient spacing between parts at different potentials to provide adequate insulation with air as at least the major part of the dielectric when the unit is at its rated voltage, terminals adjacent the bottom of the unit for receiving circuit breaker connections from below the unit, said factory assembled unit including disconnecting switches within the respective disconnecting switch compartments; and conductors from the switches to the terminals for establishing electrical connections to the switches, the instrument transformer compartments being located centrally of the unit, and the busbar and disconnecting switch compartments being located on both sides of the instrument transformer compartments and sufficiently spaced from the instrument transformer compartments to provide aisles on both sides of the instrument transformer compartments of a width sufficient to permit a person to walk in said aisles, the disconnecting switch compartments on opposite sides of the instrument transformer compartments being in communication with each other and with the instrument transformer compartments by means forming a connecting compartment below the aforementioned disconnecting switch compartments, and circuit connecting means in said connecting compartment, said circuit connecting means extending to the said terminals adjacent the bottom of the unit.

16. An enclosed bus and switching unit of a size and construction to permit shipment thereof as a factory assembled structure, said unit having means to impart rigidity thereto for shipment and including means forming busbar compartments, disconnecting switch compartments and instrument transformer compartments, said busbar compartments and disconnecting switch compartments being of a size to allow sufficient spacing between parts at different potentials to provide adequate insulation with air as at least the major part of the dielectric when the unit is at its rated voltage, said unit having a bottom wall with an opening therein, terminals adjacent said opening for receiving circuit breaker connections from below the unit, said factory assembled unit including disconnecting switches within the respective disconnecting switch compartments; and conductors from the switches to the terminals for establishing electrical connections to the switches, the instrument transformer compartments being located centrally of the unit, and the busbar and disconnecting switch compartments being located on both sides of the instrument transformer compartments, the disconnecting switch compartments on opposite sides of the instrument transformer compartments being in communication with each other and with the instrument transformer compartments by means forming a connecting compartment joining the aforementioned disconnecting switch compartments, and circuit connecting means in said connecting compartment, said circuit connecting means extending to the terminals adjacent the opening in said bottom wall.

17. A polyphase bus and switching station including a unit forming a part of a bay of the station, said unit being of a size and construction to permit shipment thereof as a factory assembled structure and comprising a housing having two similar sections one at each end of the unit with an intervening space between them, the sections being in communication by a connecting compartment, each section being subdivided to form separate busbar compartments for the respective phases, and subdivided to form a disconnecting switch compartment for each busbar compartment, the busbar compartments in each section being in alignment parallel to each other and each being of such a size as to permit supporting a busbar therein at a distance from parts at a different potential from the busbar which is sufficient to provide adequate insulation with air as at least the major part of the dielectric when the station is at its rated voltage, the disconnecting switch compartments extending at right angles to the busbar compartments and each opening into a busbar compartment, the disconnecting switch compartments of a section being spaced from one another in a direction lengthwise of the busbar compartments, a disconnecting switch mounted in each disconnecting switch compartment as a structural part of the unit, each switch including a contact making member and means for moving the same into and out of its switch closed position.

18. A polyphase bus and switching station including a unit forming a part of a bay of the station, said unit being of a size and construction to permit shipment thereof as a factory assembled structure and comprising a housing having two similar sections one at each end of the unit with an intervening space between them, the sections being in communication by a connecting compartment, each section being subdivided to form separate busbar compartments for the respective phases, and subdivided to form a disconnecting switch compartment for each busbar compartment, the busbar compartments in each section being in alignment parallel to each other and each being of such a size as to permit supporting a busbar therein at a distance from parts at a different potential from the busbar which is sufficient to provide adequate insulation with air as at least the major part of the dielectric when the station is at its rated voltage, the disconnecting switch compartments extending at right angles to the busbar compartments, a disconnecting switch mounted in each disconnecting switch compartment as a structural part of the unit, each switch including a contact making member and means for moving the same horizontally in substantially a straight line into and out of the associated busbar compartment, said moving means including parts movable into telescoping relation to an extent approximately half of the distance of travel of the contact making member from its switch closed to its switch open position.

19. A polyphase bus and switching station including a unit forming a part of a bay of the station, said unit being of a size and construction to permit shipment thereof as a factory assembled structure and comprising a housing having two similar sections one at each end of the unit with an intervening space between them, the sections being in communication by a connecting compartment, each section being subdivided to form separate busbar compartments for the respective phases, and subdivided to form a disconnecting switch compartment for each busbar compartment, the busbar compartments in each section being in alignment parallel to each other and each being of such a size as to permit supporting a busbar therein at a distance from parts at a different potential from the busbar which is sufficient to provide adequate insulation with air as at least the major part of the dielectric when the station is at its rated voltage, the disconnecting switch compartments extending at right angles to the busbar compartments, a disconnecting switch mounted in each disconnecting switch compartment as a structural part of the unit, each switch including a switch blade member and means for moving the same into and out of the associated busbar compartment, at least one of the sections having an opening, terminals for receiving circuit breaker connections, said terminals being adjacent the opening, there being a pair of terminals for each phase, conductors extending from one terminal of each pair of terminals to the respective disconnecting switches of the section where the terminals are located, means located between the sections and at least partially in said connecting compartment for establishing circuit connections with said unit, and connections between said last named means and the other terminal of each set of circuit breaker terminals.

20. A polyphase bus and switching station including a unit forming a part of a bay of the station, said unit being of a size to permit shipment thereof as a factory assembled structure and comprising a housing having two similar sections one at each end of the unit with an intervening space between them, the sections being in communication by a connecting compartment, each section being subdivided to form separate busbar compartment for the respective phases, and subdivided to form a disconnecting switch compartment for each busbar compartment, the busbar compartments in each section being in alignment parallel to each other and each being of such a size as to permit supporting a busbar therein at a distance from parts at a different potential from the busbar which is sufficient to provide adequate insulation with air as at least the major part of the dielectric when the station is at its rated voltage, the disconnecting switch compartments extending at right angles to the busbar compartments, a disconnecting switch mounted in each disconnecting switch compartment as a structural part of the unit, each switch including a switch blade and means for moving the same from the open to the closed position while maintaining the blade parallel to its initial position, at least one of the sections having an opening, terminals for receiving circuit breaker connections, said terminals being adjacent the opening, there being a pair of terminals for each phase, conductors extending from one terminal of each pair of terminals to the respective disconnecting switches of the section where the terminals are located, means located between the sections and at least partially in said connecting compartment for establishing circuit connections with said unit, and connections between said last named means and the other terminal of each set of circuit breaker terminals.

21. A polyphase bus and switching station including a unit forming a part of a bay of the station, said unit being of a size to permit shipment thereof as a factory assembled structure and comprising a housing subdivided to form a separate busbar compartment for each phase and subdivided to form a disconnecting switch compartment for each busbar compartment, said busbar compartments being vertically displaced and parallel to one another and each being of such size as to permit supporting a busbar therein at a distance from parts at a different potential from the busbar which is sufficient to provide adequate insulation with air as at least the major part of the dielectric when the station is at its rated voltage, the disconnecting switch compartments extending at right angles to the busbar compartments and each opening into a busbar compartment, the disconnecting switch compartments being spaced from one another in a direction lengthwise of the busbar compartments, a disconnecting switch secured in place in each disconnecting switch compartment, each disconnecting switch including a contact making member and means secured to the structure for moving the same into and out of its switch closed position.

22. A polyphase bus and switching station including a unit forming a part of a bay of the station, said unit being of a size to permit shipment thereof as a factory assembled structure and comprising a housing subdivided to form a separate busbar compartment for each phase and subdivided to form a disconnecting switch compartment for each busbar compartment, said busbar compartments being parallel to one another and each being of such size as to permit supporting a busbar therein at a distance from parts at a different potential from the busbar which is sufficient to provide adequate insulation with air as at least the major part of the dielectric when the station is at its rated voltage, the disconnecting switch compartments extending at right angles to the busbar compartments and each opening into a busbar compartment, a disconnecting switch secured in place in each disconnecting switch compartment, each disconnecting switch including a contact making member and means for moving the same, said moving means including an operating mechanism secured to the structure and interconnecting the switches for operation in unison while they remain secured in their respective compartments.

23. A polyphase bus and switching station including a unit forming a part of a bay of the station, said unit being of a size to permit shipment thereof as a factory assembled structure and comprising a housing subdivided to form a separate busbar compartment for each phase and subdivided to form a disconnecting switch compartment for each busbar compartment, said busbar compartments being parallel to one another and each being of such size as to permit supporting a busbar therein at a distance from parts at a different potential from the busbar which is sufficient to provide adequate insulation with air as at least the major part of the dielectric when the station is at its rated voltage, the disconnecting switch compartments extending at right angles to the busbar compartments and each opening into a busbar compartment, a disconnecting switch secured in each disconnecting switch compartment, a line connecting chamber formed as a part of the unit and divided into a number of line connecting compartments corresponding to the number of phases, the factory assembled structure having an opening therein for extending circuit breaker connections to said unit, conductors extending from each of said disconnecting switches to said opening, and circuit connections extending from said opening through the respective line connecting compartments.

24. A polyphase bus and switching station including a unit forming a part of a bay of the station, said unit being of a size to permit shipment thereof as a factory assembled structure and comprising a housing subdivided to form a separate busbar compartment for each phase and subdivided to form a disconnecting switch compartment for each busbar compartment, said busbar compartments being parallel to one another and each being of such size as to permit supporting a busbar therein at a distance from parts at a different potential from the busbar which is sufficient to provide adequate insulation with air as at least the major part of the dielectric when the station is at its rated voltage, a disconnecting switch in each disconnecting switch compartment, a line connecting chamber formed as a part of the unit and divided into a number of line connecting compartments corresponding to the number of phases, the factory assembled structure having an opening therein for extending circuit breaker connections to said unit, conductors extending from each of said disconnecting switches to said opening, circuit connections extending from said opening through the respective line connecting compartments, a plurality of instrument transformer compartments adjacent the line connecting compartments, instrument transformers in said instrument transformer compartments, and conductors extending from the circuit connections in the line connecting compartments to the instrument transformers.

25. A two-story bus and switching station comprising circuit breakers located in the lower story, a bus and disconnect switch unit located in the upper story, means supporting the unit in elevated position, said unit being of a size to permit shipment thereof as a factory assembled structure, said unit including means forming busbar compartments, disconnecting switch compartments and instrument transformer compartments, said busbar compartments and disconnecting switch compartments being of a size to allow sufficient spacing between parts at different potentials to provide adequate insulation with air as at least the major part of the dielectric when the unit is at its rated voltage, said unit having an opening therein for receiving circuit breaker connections extending thereinto from below the unit, said factory assembled unit including disconnecting switches within the respective disconnecting switch compartments; and conductors from the switches to the opening for establishing electrical connections to the switches, the busbar compartments being located one above another, and the disconnecting switch compartments being located on different levels.

26. A two-story bus and switching station comprising circuit breakers located in the lower story, a bus and disconnect switch unit located in the upper story, means supporting the unit in elevated position, said unit being of a size to permit shipment thereof as a factory assembled structure, said unit including means forming busbar receiving spaces at different levels, disconnecting switch receiving spaces at different levels and instrument transformer receiving spaces, said busbar receiving spaces and disconnecting switch receiving spaces being of a size to allow sufficient spacing between parts at different potentials to provide adequate insulation with air as at least the major part of the dielectric when the unit is at its rated voltage, said unit having a space for receiving circuit breaker connections extending thereinto from below the unit, said factory assembled unit including disconnecting switches within the respective disconnecting switch receiving spaces; and conductors from the switches to the space for receiving circuit breaker connections, the instrument transformer receiving space being located centrally of the unit, the busbar and disconnecting switch receiving spaces being provided in two similar groups one group on each side of the instrument transformer receiving space, and means forming an inspection aisle on opposite sides of the instrument transformer receiving space and of sufficient size to permit a person to walk therethrough.

27. An enclosed polyphase bus and switching unit including busbars and disconnecting switches for the respective phases and of the type wherein the busbars are spaced from one another and from parts at different potentials by an amount sufficient to provide adequate insulation with air as at least the major part of the dielectric when the station is operated at its rated potential, said unit being of a size to permit shipment thereof as a factory assembled structure exclusive of the busbars, said unit including an enclosure subdivided by partitions to form busbar compartments extending transversely of the unit and including disconnecting switch compartments, and disconnecting switches in the switch compartments of the factory assembled unit, said busbar and disconnecting switch compartments being formed in two similar spaced sets one on each side of the unit, the disconnecting switch compartments on opposite sides of the unit being in communication with each other by an enclosure and means dividing the enclosure into connecting compartments between the two sets for the respective phases, and circuit connections extending through said connecting compartments for interconnecting corresponding disconnecting switches on the two sides of the unit.

28. An enclosed bus and switching unit including busbars and disconnecting switches and of the type wherein the busbars are spaced from one another and from parts at different potentials by an amount sufficient to provide adequate insulation with air as at least the major part of the dielectric when the station is operated at its rated potential, said unit being of a size to permit shipment thereof as a factory assembled structure exclusive of the busbars, said unit including busbar compartments extending transversely of the unit and including disconnecting switch compartments extending lengthwise of the unit, said disconnecting switch compartments being spaced vertically from one another and opening into the respective busbar compartments, and disconnecting switches in the switch compartment of the factory assembled unit, said busbar and disconnecting switch compartments being formed in two similar spaced sets one on each side of the unit, the disconnecting switch compartments on opposite sides of the unit being in communication with each other by means forming connecting compartments between the two sets, circuit connections extending through said connecting compartments for interconnecting corresponding disconnecting switches on the two sides of the unit, and means for extending a line connection into the connecting compartments and for joining said line connection with said circuit connections.

29. An enclosed bus and switching unit including busbars and disconnecting switches and of the type wherein the busbars are spaced from one another and from parts at different potentials by an amount sufficient to provide adequate insulation with air as at least the major part of the dielectric when the station is operated at its rated potential, said unit being of a size to permit shipment thereof as a factory assembled structure exclusive of the busbars, and including busbar compartments extending transversely of the unit and also disconnecting switch compartments extending lengthwise of the unit, said disconnecting switch compartments being spaced vertically from one another and also spaced from one another transversely of the unit and opening into the respective busbar compartments, and disconnecting switches in the switch compartments of the factory assembled unit, said busbar and disconnecting switch compartments being formed in two similar spaced sets one on each side of the unit, the disconnecting switch compartments on opposite sides of the unit being in communication with each other by means forming connecting compartments between the two sets, circuit connections extending through said connecting compartments for interconnecting corresponding disconnecting switches on the two sides of the unit, means for extending a line connection into the connecting compartments and for joining said line connection with said circuit connections, said circuit connections including additional disconnecting switches within the connecting compartments and located one on each side of the juncture between the line and said circuit connections.

30. A polyphase bus and switching unit having a bottom chamber divided to form a plurality of side by side longitudinally extending line connecting compartments and having openings at each end thereof for receiving circuit breaker connections, means for extending line connections into each compartment at substantially the center thereof, disconnecting switches in each compartment on opposite sides of said line connections, a terminal of both switches in a compartment being connected with the line, connections from the other terminals of the switches to the respective circuit breaker connection openings, said unit having a set of busbar compartments at each end thereof and having a second set of disconnecting switch compartments at each end thereof, disconnecting switches in the respective disconnect switch compartments, and connections from the last named disconnecting switch compartments to the adjacent circuit breaker connection openings.

31. A polyphase bus and switching station including a unit forming a part of a bay of the staion, a circuit breaker disposed outside of the unit and electrically connected therewith, said unit comprising a housing subdivided to form a separate horizontally extending busbar compartment for each phase and subdivided to form a disconnecting switch compartment for each busbar compartment, said disconnecting switch compartments extending at right angles to the busbar compartments, said busbar compartments being parallel to each other, a disconnecting switch secured in each switch compartment and movable therein from its switch open to its switch closed position while secured in said switch compartment, sets of circuit breaker receiving terminals for the opposite poles of each phase of the circuit breaker, the terminals of each set being spaced from one another in a direction transversely of the busbar compartments, connections between a terminal of each set and the disconnecting switch of the corresponding phase, and circuit connections to the opposite pole terminal of each set of terminals and extending within the unit horizontally and below the disconnecting switches and below and transversely of the busbar compartments.

32. A polyphase bus and switching station including a unit forming a part of a bay of the station, a circuit breaker disposed outside of the unit and electrically connected therewith, said unit comprising a housing subdivided to form a separate horizontally extending busbar compartment for each phase and subdivided to form a disconnecting switch compartment for each busbar compartment, said disconnecting switch compartments extending horizontally at right angles to the busbar compartments, said busbar compartments being parallel to each other and spaced vertically of one another, a disconnecting switch secured in each switch compartment and movable therein from its switch open position to its switch closed position while secured in said compartment, sets of circuit breaker receiving terminals for the opposite poles of each phase of the circuit breaker, the terminals of each set being spaced from one another in a direction transversely of the busbar compartments, connections between a terminal of each set and the disconnecting switch of the corresponding phase, and circuit connections to the opposite pole terminal of each set of terminals and extending within the unit horizontally and below the disconnecting switches and below and transversely of the busbar compartments, the two connections to the terminals of the same phase having substantially no displacement from one another in a direction lengthwise of the busbar compartments, the second mentioned connection to the circuit breaker receiving terminal of each set including another disconnecting switch spaced vertically from the first mentioned disconnecting switch.

33. A two story polyphase bus and switching station having a plurality of side by side bays, each bay including at least one circuit breaker in the lower story and means forming busbar compartments and disconnecting switch compartments in the upper story, said compartment forming means being a factory assembled structure of a size to permit railroad shipment thereof, corresponding circuit breakers in the various bays being in alignment lengthwise of the station, there being at least a partial aisle space transversely of the station between adjacent bays, disconnecting switches mounted in the respective disconnecting switch compartments, and operating mechanism for the switches extending to said aisle space.

34. A two story polyphase bus and switching station having a plurality of side by side bays, each bay including at least one circuit breaker in the lower story and means forming busbar compartments and disconnecting switch compartments in the upper story, the compartments being of such size as to permit mounting of the live parts therein at a sufficient distance from parts at different potentials to provide adequate insulation with air as a major part of the dielectric when the station is operating at its rated voltage, said compartment forming means for each bay constituting a factory assembled structure of a size to permit railroad shipment thereof, the corresponding busbar compartments of adjacent bays being in alignment, the second story structures of adjacent bays being spaced from one another to provide at least a partial aisle between bays, the station including a roof and side wall enclosure for all the structures, said enclosure being supported in part at least by the factory assembled structure in each bay.

35. A bus and switching station comprising horizontally extending parallel busbars, each busbar having a disconnecting switch associated therewith which includes a switch blade movable in a direction substantially lengthwise of the blade and substantially at right angles to its associated busbar, and each busbar carrying a switch contact which is engaged by the blade of the associated switch in its switch closed position, and an enclosure for all of the busbars and disconnecting switches, said enclosure including partitions forming separate compartments for each busbar and for each disconnecting switch.

36. A bus and switching station including a stationary supporting structure, horizontally extending parallel busbars supported thereby at different levels, each busbar having a disconnecting switch associated therewith which is secured to the stationary structure and includes a blade secured to the stationary structure and extending at right angles to the busbar through its switch operating movement and movable in a plane at right angles to the busbars, and each busbar having a switch contact engaged by the contact making member of the associated switch in its switch closed position, the switches being spaced from one another in a direction parallel to the busbars and at the levels of the corresponding busbars.

37. A bus and switching unit including a stationary supporting structure and busbars and disconnecting switches mounted on said structure and of the type wherein the busbars are spaced from one another and from parts at different potentials by an amount sufficient to provide adequate insulation with air as at least the major part of the dielectric when the station is operated at its rated potential, said unit including means for imparting rigidity thereto and including means for supporting busbars transversely of the unit, the disconnecting switches extending lengthwise of the unit and being spaced from one another in a direction vertically and transversely of the unit, each of the said switches including a contact making member and means for moving the same from the switch closed position to the switch open position in a direction having a major component lengthwise of the unit.

38. A bus and switching unit including a stationary supporting structure and busbars and disconnecting switches mounted on said structure and of the type wherein the busbars are spaced from one another and from parts at different potentials by an amount sufficient to provide adequate insulation with air as at least the major part of the dielectric when the station is operated at its rated potential, said unit including means for imparting rigidity thereto and including means for supporting busbars transversely of the unit, the disconnecting switches extending lengthwise of the unit and being spaced from one another in a direction vertically and transversely of the unit, each of the said switches including a contact making member and means for moving the same in a direction substantially lengthwise of the unit from the switch closed position to the switch open position, said busses and disconnecting switches being provided in two similiar spaced sets, one on each side of the unit, with at least one aisle between them and of sufficient size for a person to pass therethrough.

39. A bus and switching unit including a stationary supporting structure and busbars and disconnecting switches mounted on said structure and of the type wherein the busbars are spaced from one another and from parts at different potentials by an amount sufficient to provide adequate insulation with air as at least the major part of the dielectric when the station is operated at its rated potential, said unit including means for imparting rigidity thereto and including means for supporting busbars transversely of the unit, the disconnecting switches extending lengthwise of the unit and being spaced from one another in a direction vertically and transversely of the unit, each of the said switches including a contact making member and means for moving the same in a direction substantially lengthwise of the unit from the switch closed position to the switch open position, said busses and disconnecting switches being provided in two similar spaced sets, one on each side of the unit, instrument transformers between the two sets and spaced from both of the sets, and means forming aisles between the instrument transformers and each of the sets, said aisles being of sufficient size for a person to pass therethrough.

40. A polyphase bus and switching station including a unit forming a part of a bay of the station, said unit being of a size and construction to permit shipment thereof as a factory assembled structure and comprising two similar spaced apart sections one at each end of the unit, each section having means for supporting busbars for the respective phases, a disconnecting switch for each busbar, the busbar supports being arranged to support busbars horizontally in parallel relationship at different levels and a distance from parts at a different potential from the busbars sufficient to provide adequate insulation with air as at least the major part of the dielectric when the station is at its rated voltage, the disconnecting switches extending at right angles to the busbars and being spaced from one another in a direction lengthwise of the busbars as well as vertically, at least a majority of the disconnecting switches being mounted on the unit as a part of the factory assembled structure, each switch including a switch blade, and means for moving the same into and out of its switch closed position in a line extending substantially lengthwise of the switch blade.

41. A polyphase bus and switching station including a unit forming a part of a bay of a station, said unit being of a size to permit shipment thereof as a factory assembled structure and comprising a frame-work subdivided to form separate busbar spaces for each phase and subdivided to form disconnecting switch spaces for each busbar space with grounded parts of the frame-work between adjacent disconnecting switch spaces and between adjacent busbar spaces, said busbar spaces being at different levels and parallel to one another and each being of such size as to permit supporting a busbar therein at a distance from parts at a different potential from the busbar sufficient to provide adequate insulation with air as at least the major part of the dielectric when the station is at its rated voltage, the disconnecting switch receiving spaces extending at right angles to the busbar receiving spaces and opening thereinto and spaced from one another vertically as well as in a direction lengthwise of the busbar receiving spaces, a disconnecting switch secured in place in each disconnecting switch space, each disconnecting switch including a contact making member and means secured to the structure for moving said member into and out of its switch closed position in a direction substantially at right angles to the busbars and lengthwise of the unit.

42. A two story polyphase bus and switching station comprising circuit breakers located in the lower story, a bus and disconnect switch unit located in the upper story, means for supporting the unit in elevated position, said unit being of a size to permit shipment thereof as a factory assembled structure and including an open frame having means forming busbar receiving spaces for the respective phases and disconnect switch receiving spaces for the respective phases, the spaces for the respective phases being separated from each other by grounded parts of the open frame structure, said spaces being of a size to allow spacing between parts at different potentials to provide adequate insulation with air as at least the major part of the dielectric when the unit is at its rated voltage, circuit breaker receiving connections at the bottom of the unit, disconnecting switches mounted in the disconnect switch receiving spaces, a majority of said switches constituting a part of the factory assembled unit, the busbar receiving spaces for the respective phases being at different levels and the disconnecting switch receiving spaces for the respective phases being at different levels.

43. A two story polyphase bus and switching station comprising circuit breakers located in the lower story, a bus and disconnect switch unit located in the upper story, means for supporting the unit in elevated position, said unit being of a size to permit shipment thereof as a factory assembled structure and including an open frame having means forming busbar receiving spaces for the respective phases and disconnect switch receiving spaces for the respective phases, corresponding spaces for different phases being separated from each other by grounded parts of the structure, said spaces being of a size to allow spacing between parts at different potentials to provide adequate insulation with air as at least the major part of the dielectric when the unit is at its rated voltage, circuit breaker receiving connections at the bottom of the unit, disconnecting switches mounted in the disconnect switch receiving spaces, a majority of said switches constituting a part of the factory assembled unit, the different phase busbar receiving spaces and disconnecting switch receiving spaces being at different levels, instrument transformers located centrally of the unit, the busbar receiving spaces and the disconnect switch receiving spaces being provided in two similar groups, one on each side of the instrument transformers and spaced therefrom and means forming an aisle on each side of the instrument transformers which aisles are of sufficient size to permit a man to pass therethrough, said unit providing grounded sides for the aisles.

44. A two story polyphase bus and switching station comprising circuit breakers located in the lower story, a bus and disconnect switch unit located in the upper story, means for supporting the unit in elevated position, said unit being of a size to permit shipment thereof as a factory assembled structure and including an open frame having means forming busbar receiving spaces for the respective phases and disconnect switch receiving spaces for the respective phases, corresponding spaces for the different phases being separated from the other by grounded parts of the structure, said spaces being of a size to allow spacing between parts at different potentials to provide adequate insulation with air as at least the major part of the dielectric when the unit is at its rated voltage, circuit breaker receiving connections at the bottom of the unit, disconnecting switches mounted in the disconnect switch receiving spaces, a majority of said switches constituting a part of the factory assembled unit, the different phase busbar receiving spaces and disconnecting switch receiving spaces being at different levels, instrument transformers located centrally of the unit, the busbar receiving spaces and the disconnect switch receiving spaces being provided in two similar groups, one on each side of the instrument transformers and spaced therefrom, means forming an aisle on each side of the instrument transformers which aisles are of sufficient size to permit a man to pass therethrough, said unit providing grounded sides for the aisles, line disconnecting switches, at least one for each phase, the line disconnecting switches being in substantially the same horizontal plane and located between the two first mentioned sets of disconnecting switches at a level different from that of the aisle and constituting part of the factory assembled unit, and circuit connections including said last mentioned disconnecting switches for interconnecting corresponding disconnecting switches on the two sides of the unit.

45. A two story polyphase bus and switching station comprising circuit breakers located in the lower story, a bus and disconnect switch unit located in the upper story, means for supporting the unit in elevated position, said unit being of a size to permit shipment thereof as a factory assembled structure and including an open frame having means forming busbar receiving spaces for the respective phases and disconnect switch receiving spaces for the respective phases, corresponding spaces for the different phases being separated from the other by grounded parts of the structure, said spaces being of a size to allow spacing between parts at different potentials to provide adequate insulation with air as at least the major part of the dielectric when the unit is at its rated voltage, circuit breaker receiving connections at the bottom of the unit, disconnecting switches mounted in the disconnect switch receiving spaces, a majority of said switches constituting a part of the factory assembled unit, the different phase busbar receiving spaces and disconnecting switch receiving spaces being at different levels, instrument transformers located centrally of the unit, the busbar receiving spaces and the disconnect switch receiving spaces being provided in two similar groups, one on each side of the instrument transformers and spaced therefrom, means forming an aisle on each side of the instrument transformers which aisles are of sufficient size to permit a man to pass therethrough, said unit providing grounded sides for the aisles, line disconnecting switches, at least one for each phase, the line disconnecting switches being in substantially the same horizontal plane and located between the two first mentioned sets of disconnecting switches at a level different from that of the aisle and constituting part of the factory assembled unit, circuit connections including said last mentioned disconnecting switches for interconnecting corresponding disconnecting switches on the two sides of the unit, and means establishing line circuit connections to said line disconnecting switches and through said line disconnecting switches to the busbar disconnecting switches.

ALLEN M. ROSSMAN.